United States Patent
Yang et al.

(10) Patent No.: US 9,619,636 B2
(45) Date of Patent: Apr. 11, 2017

(54) APPARATUSES AND METHODS FOR SECURE DISPLAY ON SECONDARY DISPLAY DEVICE

(71) Applicant: QUALCOMM Incorporated, San Diego, CA (US)

(72) Inventors: Yafei Yang, Escondido, CA (US); Xu Guo, San Diego, CA (US); Liang Cai, San Diego, CA (US); Xinmu Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/616,353

(22) Filed: Feb. 6, 2015

(65) Prior Publication Data
US 2016/0232339 A1   Aug. 11, 2016

(51) Int. Cl.
*G06F 21/32* (2013.01)
*H04L 9/32* (2006.01)
(Continued)

(52) U.S. Cl.
CPC .............. *G06F 21/32* (2013.01); *G06F 1/163* (2013.01); *G06F 3/04842* (2013.01); *G06F 3/1423* (2013.01); *G06F 21/45* (2013.01); *G06F 21/602* (2013.01); *H04L 9/3231* (2013.01); *H04L 9/3247* (2013.01); *H04L 63/0853* (2013.01); *H04L 63/0861* (2013.01); *H04W 12/04* (2013.01); *H04W 12/08* (2013.01);
(Continued)

(58) Field of Classification Search
CPC ...... H04L 63/08; H04L 63/0861; G06F 21/31

USPC .......................................................... 726/19
See application file for complete search history.

(56) References Cited

U.S. PATENT DOCUMENTS

| 4,227,253 A * | 10/1980 | Ehrsam | G06Q 20/3829 340/5.74 |
| 7,922,082 B2 * | 4/2011 | Muscato | G06Q 20/10 235/380 |

(Continued)

FOREIGN PATENT DOCUMENTS

WO   WO-2006106405   10/2006

OTHER PUBLICATIONS

International Search Report and Written Opinion—PCT/US2016/012883—ISA/EPO—Jul. 8, 2016.

(Continued)

*Primary Examiner* — Kambiz Zand
*Assistant Examiner* — Tongoc Tran
(74) *Attorney, Agent, or Firm* — Loza & Loza, LLP

(57) ABSTRACT

One feature pertains to a computing device that includes an input interface, a communication interface, and a processing circuit that is adapted to receive a request from an application to authorize an action and generate a dynamic access code associated with the action. The processing circuit also transmits a message to a secondary display device that includes information data associated with the action and the dynamic access code for display on a display of the secondary display device. The processing circuit authorizes the action received from the application if the dynamic access code is entered into the input interface. Multiple, unique dynamic codes may also be associated with different actions the application may make requests for, which are also transmitted to the secondary display device for display.

27 Claims, 15 Drawing Sheets

(51) Int. Cl.
*H04L 29/06* (2006.01)
*H04W 12/04* (2009.01)
*H04W 12/08* (2009.01)
*G06F 1/16* (2006.01)
*G06F 3/0484* (2013.01)
*G06F 3/14* (2006.01)
*G06F 21/45* (2013.01)
*G06F 21/60* (2013.01)
*G06F 21/55* (2013.01)
*H04W 4/00* (2009.01)

(52) U.S. Cl.
CPC ........ *G06F 21/554* (2013.01); *H04L 2209/56* (2013.01); *H04W 4/008* (2013.01)

(56) References Cited

U.S. PATENT DOCUMENTS

| | | | |
|---|---|---|---|
| 8,352,738 | B2 | 1/2013 | Parno et al. |
| 8,639,629 | B1* | 1/2014 | Hoffman ................ G06Q 20/20 705/44 |
| 8,739,282 | B1* | 5/2014 | Jayaraman .............. G06F 21/53 713/187 |
| 8,832,807 | B1* | 9/2014 | Kuo ........................ G06F 21/45 713/183 |
| 2002/0026575 | A1* | 2/2002 | Wheeler ................ G06Q 20/00 713/156 |
| 2004/0039651 | A1 | 2/2004 | Grunzig et al. |
| 2011/0082791 | A1 | 4/2011 | Baghdasaryan et al. |
| 2011/0140834 | A1 | 6/2011 | Kiliccote |
| 2013/0097706 | A1* | 4/2013 | Titonis ................... G06F 21/56 726/24 |
| 2013/0133086 | A1 | 5/2013 | Liberman et al. |
| 2013/0232083 | A1* | 9/2013 | Smith ................ G06Q 20/3278 705/67 |
| 2013/0262317 | A1* | 10/2013 | Collinge ............ G06Q 20/3823 705/71 |
| 2014/0096179 | A1 | 4/2014 | Ben-Shalom et al. |
| 2014/0149746 | A1 | 5/2014 | Yau |
| 2014/0279309 | A1* | 9/2014 | Cowen .................... G06Q 40/12 705/30 |
| 2014/0289116 | A1 | 9/2014 | Polivanyi |
| 2014/0289127 | A1 | 9/2014 | Suominen |
| 2014/0304516 | A1 | 10/2014 | Fahrny et al. |
| 2015/0046336 | A1* | 2/2015 | Cummins .......... G06Q 20/3829 705/65 |
| 2015/0302402 | A1* | 10/2015 | Chan Chi Yuen ... G06Q 20/322 705/71 |
| 2016/0027017 | A1* | 1/2016 | Chitragar ........... G06Q 20/4018 705/71 |
| 2016/0034058 | A1* | 2/2016 | Stauber .................. G08C 17/02 345/173 |
| 2016/0065559 | A1* | 3/2016 | Archer ................ H04L 63/0861 726/8 |
| 2016/0080943 | A1* | 3/2016 | Ives-Halperin ........ G06Q 10/02 713/168 |

OTHER PUBLICATIONS

Partial International Search Report—PCT/US2016/012883—ISA/EPO—Apr. 7, 2016.
International Search Report and Written Opinion—PCT/US2016/012883—ISA/EPO—Aug. 8, 2016.

* cited by examiner

APPARATUSES AND METHODS FOR SECURE DISPLAY ON SECONDARY DISPLAY DEVICE

BACKGROUND

Field

Various features generally relate to security protocols and devices, and more particularly to methods and devices for securely displaying information on a secondary display device.

Background

As mobile devices such as mobile phones, smartphones, laptops, tablets, etc. increase in complexity and capability, so too does the opportunity for malicious use of resources and access afforded by such devices. Security protocols and methods are thus routinely used by mobile devices to help thwart malicious attacks and misuse of mobile devices. However, there still exists many different types of security holes for mobile devices that are currently poorly addressed and consequently are capable of being exploited by rogue entities and software applications.

FIG. 1 illustrates a mobile device 100, such as a mobile smartphone, found in the prior art. The mobile device 100 includes a processor 102, a display 104, and a high level operating system (HLOS) 106 that is host to an application 108. In the illustrated example, the application 108 may be a third party application (e.g., an application not associated, produced, and/or endorsed by the original equipment manufacturer (OEM)) that is malicious in that it may take one or more actions that are detrimental to the mobile device 100 and/or its user, or are generally undesirable and unauthorized by the mobile device 100.

For example, the mobile device 100 may be configured such that financial transactions must be approved by a user of the mobile device 100 before they are executed. In particular, approval by the user to proceed with the financial transaction in turn directs the processor 102 to authorize the transaction. In one instance, the malicious application 108 may request the user of the mobile device 100 to approve a financial transaction purportedly totaling $5. Specifically, the application 108 may transmit to or otherwise cause the display 104 to show the user a financial transaction approval request 110 that states the requested amount is $5. However, at the same time the display 104 shows the $5 request 110 to the user, the malicious application 108 insidiously transmits a request 112 to the processor 102 to authorize the execution of a financial transaction in the amount of $500. The user may then attempt to approve the $5 transaction request 110 shown on the display 104 by selecting a corresponding "approve" or "OK" option thereby unwittingly causing the processor 102 to authorize instead the $500 request 112 submitted to it by the malicious application 108.

The instance described above with respect to FIG. 1 is merely one example. Malicious applications 108 may generally take advantage of unsecure displays 104 on mobile devices 100 by displaying one thing on the display 104 yet requesting authorization of something very different. Besides unscrupulous financial transactions, another non-limiting, non-exclusive example is a malicious application 108 displaying a request to redirect the user to a first uniform resource locator (URL) address (e.g., website address) while simultaneously requesting the mobile device's 100 processor 102 to redirect the user to another, second website that may have nefarious intentions.

Thus, there is a need to provide robust mobile devices and methods for mobile devices that secure users and mobile devices from security vulnerabilities like the ones described above. In particular, there is a need for secure mobile devices and methods to address the inherent security vulnerabilities that are present due to a mobile device's unsecure display.

SUMMARY

One feature provides a computing device comprising an input interface, a communication interface, and a processing circuit communicatively coupled to the communication interface and the input interface. The processing circuit is adapted to receive a request from an application to authorize an action, generate a dynamic access code associated with the action, transmit a message to a secondary display device for display on a display of the secondary display device, the message including information data associated with the action and the dynamic access code, and authorize the action received from the application if the dynamic access code is entered into the input interface. According to one aspect, the processing circuit further adapted to encrypt the message using a session key prior to transmitting the message to the secondary display device. According to another aspect, the processing circuit further adapted to provide a digital signature using a secret key to the application after authorizing the action received from the application.

According to one aspect, the processing circuit is a secure processor that is part of a secure execution environment. According to another aspect, the processing circuit is an applications processor unit (APU) that is adapted to execute software code associated with applications and/or a high level operating system (HLOS). According to another aspect, the dynamic access code is at least one of a number code, an alphanumeric code, a drawing, a symbol, a picture, and/or an icon. According to yet another aspect, the dynamic access code is at least one of a linear barcode and/or a matrix barcode, and the input interface includes at least one of a camera and/or a barcode scanner adapted to scan the at least one of the linear barcode and/or the matrix barcode displayed on the secondary display device to obtain barcode data, and the processing circuit is further adapted to authorize the action received from the application if the barcode data obtained matches expected barcode data transmitted to the secondary display device.

According to one aspect, the processing circuit further adapted to receive a plurality of requests from the application to authorize a plurality of actions, generate a plurality of unique dynamic access codes, each unique dynamic access code generated associated with a single action of the plurality of actions, transmit a plurality of messages to the secondary display device for display on the display of the secondary display device, each message of the plurality of messages including information data associated with an action of the plurality of actions and the dynamic access code associated with the action of the plurality of actions, and authorize each action of the plurality of actions if the dynamic access code associated with the action of the plurality of actions is entered into the input interface. According to another aspect, the action includes at least one of (a) transferring of funds, (b) directing the computing device to a website, and/or (c) at least one of encrypting and/or decrypting data with a secret key. According to yet another aspect, the application is resident to the computing device.

According to one aspect, transmitting the message to the secondary display device for display on the display of the secondary display device includes transmitting the message to a wearable device for display on a display of the wearable device. According to another aspect, the message is transmitted to the secondary display device wirelessly and directly using a short range communication protocol. According to yet another aspect, the application causes a display of the computing device to display a request for user approval of an action different than the action for which the request from the application to authorize is received. According to another aspect, the information data associated with the action includes at least one of a financial transaction amount, a URL address, and/or a file name to be encrypted and/or decrypted.

Another feature provides a method operational at a primary electronic communication device for secure display on a secondary display device, the method comprising receiving, at a processing circuit of the primary electronic communication device, a request from an application to authorize an action, generating at the processing circuit a dynamic access code associated with the action, transmitting a message from the primary electronic communication device to the secondary display device for display on a display of the secondary display device, the message including information data associated with the action and the dynamic access code, and authorizing the action received from the application if the dynamic access code is entered into an input interface of the primary electronic communication device. According to one aspect, the method further comprises encrypting the message using a session key prior to transmitting the message to the secondary display device. According to another aspect, the method further comprises providing a digital signature using a secret key to the application after authorizing the action received from the application.

According to one aspect, the method further comprises receiving a plurality of requests from the application to authorize a plurality of actions, generating a plurality of unique dynamic access codes, each unique dynamic access code generated associated with a single action of the plurality of actions, transmitting a plurality of messages from the primary electronic communication device to the secondary display device for display on the display of the secondary display device, each message of the plurality of messages including information data associated with an action of the plurality of actions and the dynamic access code associated with the action of the plurality of actions, and authorizing each action of the plurality of actions if the dynamic access code associated with the action of the plurality of actions is entered into the input interface.

Another feature provides a computing device comprising a means for receiving, at a processing circuit of the computing device, a request from an application to authorize an action, a means for generating at the processing circuit a dynamic access code associated with the action, a means for transmitting a message from the computing device to a secondary display device for display on a display of the secondary display device, the message including information data associated with the action and the dynamic access code, and a means for authorizing the action received from the application if the dynamic access code is entered into an input interface of the computing device.

Another feature provides a computer-readable storage medium having instructions stored thereon for a primary electronic communication device to securely display on a secondary display device, the instructions which when executed by at least one processor causes the processor to receive, at a processing circuit of the primary electronic communication device, a request from an application to authorize an action, generate at the processing circuit a dynamic access code associated with the action, transmit a message from the primary electronic communication device to the secondary display device for display on a display of the secondary display device, the message including information data associated with the action and the dynamic access code, and authorize the action received from the application if the dynamic access code is entered into an input interface of the primary electronic communication device.

Another feature provides a computing device comprising an input interface, a memory circuit, a communication interface, and a processing circuit communicatively coupled to the communication interface, the memory circuit, and the input interface. The processing circuit is adapted to receive a request from an application to authorize an action, transmit a message to a secondary display device for display on a display of the secondary display device, the message including information data associated with the action, receive, at the input interface, biometric data associated with a user of the computing device, and authorize the action received from the application if it is determined that the biometric data received at the input interface matches biometric data stored in the memory circuit.

Another feature provides a method operational at a primary electronic communication device for secure display on a secondary display device, the method comprising receiving, at a processing circuit associated with the primary electronic communication device, a request from an application to authorize an action, transmitting a message from the primary electronic communication device to the secondary display device for display on a display of the secondary display device, the message including information data associated with the action, receiving, at an input interface of the primary electronic communication device, biometric data associated with a user of the primary electronic communication device, and authorizing the action received from the application if it is determined that the biometric data received at the input interface matches biometric data stored in a memory circuit of the primary electronic communication device.

Another feature provides a computing device comprising a means for receiving, at a processing circuit associated with the computing device, a request from an application to authorize an action, a means for transmitting a message from the computing device to a secondary display device for display on a display of the secondary display device, the message including information data associated with the action, a means for receiving, at an input interface of the computing device, biometric data associated with a user of the computing device, and a means for authorizing the action received from the application if it is determined that the biometric data received at the input interface matches biometric data stored in a memory circuit of the computing device.

Another feature provides a computer-readable storage medium having instructions stored thereon for a primary electronic communication device to securely display on a secondary display device, the instructions which when executed by at least one processor causes the processor to receive, at a processing circuit of the primary electronic communication device, a request from an application to authorize an action, transmit a message from the primary electronic communication device to the secondary display device for display on a display of the secondary display device, the message including information data associated with the action, receive, at an input interface of the primary electronic communication device, biometric data associated with a user of the primary electronic communication device, and authorize the action received from the application if it is determined that the biometric data received at the input interface matches biometric data stored in a memory circuit of the primary electronic communication device.

DETAILED DESCRIPTION

In the following description, specific details are given to provide a thorough understanding of the various aspects of the disclosure. However, it will be understood by one of ordinary skill in the art that the aspects may be practiced without these specific details. For example, circuits and structures may be shown in block diagrams in order to avoid obscuring the aspects in unnecessary detail. In other instances, well-known circuits, structures and techniques may not be shown in detail in order not to obscure the aspects of the disclosure. The word "exemplary" is used herein to mean "serving as an example, instance, or illustration." Any implementation or aspect described herein as "exemplary" is not necessarily to be construed as preferred or advantageous over other aspects of the disclosure.

Overview

According to one feature, systems, methods, and apparatuses described herein cause a processing circuit of a primary mobile device to generate one or more dynamic access codes each associated with a different action that an application has requested the processing circuit to authorize. The dynamic access codes along with data related to the actions being requested are transmitted for display on a secondary display device, such as a wearable device, in order for a user to determine the legitimacy of the requests made. For example, the user may check to see if the data related to the actions being requested shown on the secondary display device are consistent with actions that the application purports to carry out as shown on the display of the primary mobile device. If the actions are consistent then the user may instruct the processing circuit to authorize the actions requested by entering in the dynamic access codes associated with each action directly into an input interface of the primary mobile device.

According to another feature, systems, methods, and apparatuses described relate to a primary mobile device whose processing circuit receives a request from an application to authorize an action. The processing circuit then transmits data related to action being requested to a display of a secondary display device, such as a wearable device, in order for a user to determine the legitimacy of the requests made. For example, the user may check to see if the data related to the action being requested shown on the secondary display device is consistent with the action that the application purports to carry out as shown on the display of the primary mobile device. If the actions are consistent then the user may instruct the processing circuit to authorize the actions requested by providing biometric data, such as a fingerprint, a retinal scan, etc. to the primary mobile device.

Figure 1:
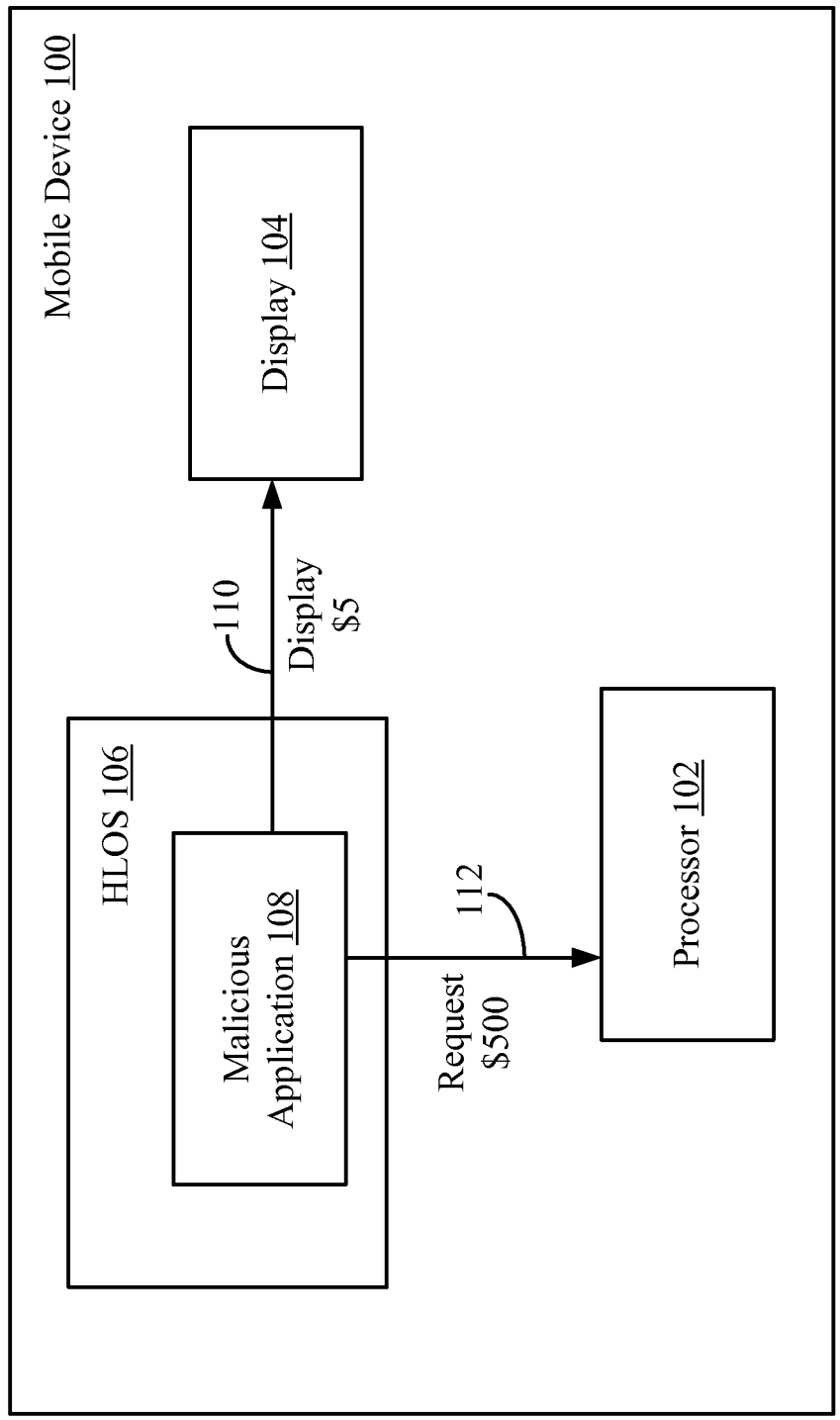
FIG. 1 illustrates a mobile device, such as a mobile smartphone, found in the prior art.
Figure 2:
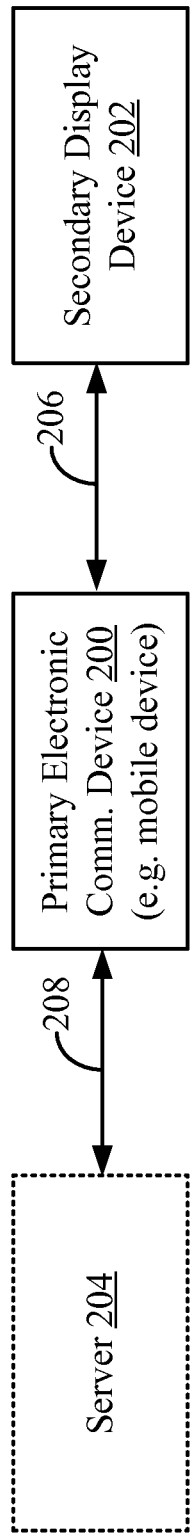
FIG. 2 illustrates a high-level schematic block diagram for secure display on a secondary display device.

Exemplary Apparatuses, Methods, and Systems for Secure Display on a Secondary Display Device FIG. 2 illustrates a high-level schematic block diagram for secure display on a secondary display device according to one aspect of the disclosure. The primary electronic communication device 200 (e.g., "computing device") may be any type of electronic communication device such as, but not limited to, a personal computer, a laptop computer, a tablet, a mobile phone, a smartphone, a personal digital assistant, etc. However, for purposes of clarity in the examples described herein, the primary electronic communication device 200 (e.g., primary mobile device) may be assumed to a mobile device such as a smartphone. The same examples, illustrations, and descriptions provided below may be equally applicable though to the other aforementioned electronic communication devices.

The primary mobile device 200 is in communication 206 with a secondary display device 202. The secondary display device 202 may be any portable electronic device that includes a display and a communication interface. In one aspect, the secondary display device 202 is a device that may be simpler in design, complexity, capability, and/or resources than the primary mobile device 200. For example, the secondary display device 202 may be a wearable electronic communication device such as, but not limited to, a smartwatch, optical head-mounted display glasses (e.g., Google Glass®), or any other wireless electronic communication device having a display. According to one example, the communication channel 206 between the primary mobile device 200 and the secondary display device 202 may be direct such as Bluetooth®, Zigbee®, and/or other short range direct communication protocols. According to another example, the communication channel 206 between the primary mobile device 200 and the secondary display device 202 may be indirect such that other intermediary devices and/or nodes relay messages between the two devices 200, 202. Examples of such indirect communication channels include wide-area networks (WAN), local area networks (LAN) utilizing access points, cellular telephone networks, etc.

The primary mobile device 200 may also be optionally in communication 208 with other electronic devices that may be remotely located such as one or more servers 204. The server 204 (e.g., third party server) may have a multitude of varying purposes and functions including, but not limited to, data storage, website hosting, financial transaction processing, etc. The primary mobile device 200 may communicate 208 with the server 204 via various communication mediums and protocols including, but not limited to, the internet.

As explained in greater detail below, the primary mobile device 200 may utilize a display of the secondary display device 202 to authenticate and authorize one or more requests at the primary mobile device 200. In so doing it is assumed that the display of the secondary display device 202 is more secure than the display of the primary mobile device 200 because the secondary display device's display may not easily be controlled or accessed by applications resident on (e.g., running at) the primary mobile device 200.

Figure 3:
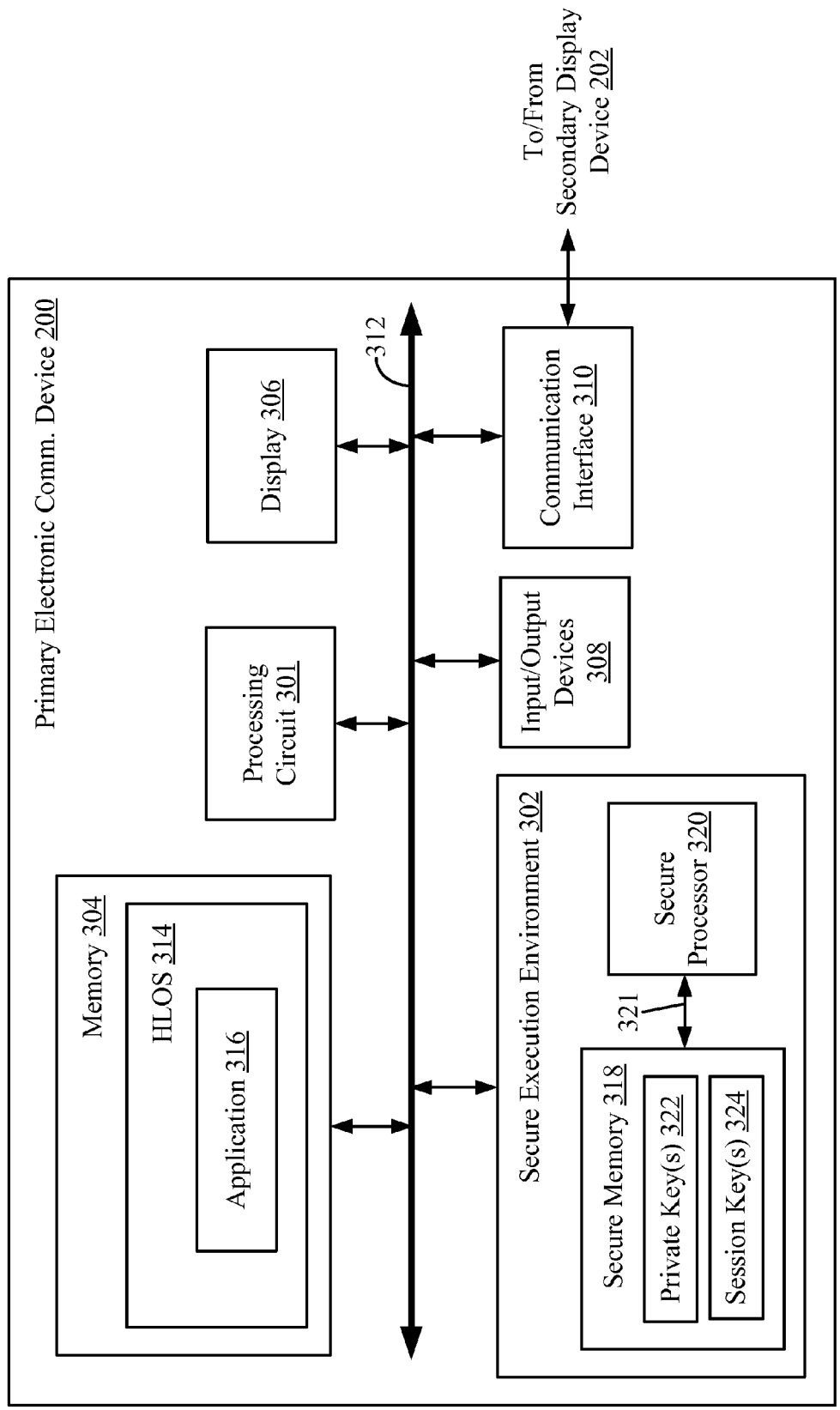
FIG. 3 illustrates a high-level schematic block diagram of a primary mobile device.

FIG. 3 illustrates a high-level schematic block diagram of the primary mobile device 200 according to one aspect. The primary mobile device 200 may include a processing circuit 301, a secure execution environment (SEE) 302, a memory circuit 304, a display 306, input/output (I/O) devices 308, and/or a communication interface 310. The processing circuit 301, the secure execution environment 302, the memory circuit 304, the display 306, the I/O devices 308, and/or the communication interface 310 may be communicatively coupled to each other by, for example, a communication bus 312. The memory circuit 304 may store data associated with a high level operating system (HLOS) 314 and various applications 316 (e.g., third party applications, user applications, etc.). The applications 316 may be executed within the HLOS 314 environment. The processing circuit 301 may be an applications processor unit (e.g., ARM® processor) that executes applications 316 and the HLOS 314 and may or may not be secure.

The SEE 302 may include one or more secure memory circuits 318 and/or one or more secure processing circuits 320. The secure memory circuit 318 may include a plurality of cryptographic keys 322, 324. In another aspect, the secure processing circuit 320 may include the plurality of cryptographic keys 322, 324. As explained in greater detail below, one or more of the keys 322 may be private keys (e.g., "secret keys" or "credentials") that are not publicly disclosed and/or may be known only to the SEE 302. In some aspects, the private keys 322 may each be associated with a different third party (e.g., third party servers 204) and are used to in connection with that third party to approve actions or transactions associated with that third party. Another one or more keys 324 may be session keys that are used to secure/encrypt transmissions between the primary mobile device 200 and the secondary display device 202. The secure memory circuit 318 may include volatile and non-volatile memory circuits.

The SEE 302 includes hardware modules, elements, and circuits, such as the memory circuit(s) 318, the processing circuit(s) 320, secure elements, and/or communication buses/lines 321, that may be unavailable to applications 316 (e.g., third party applications) and/or the HLOS 314 itself. That is, the SEE 302 may have complete control and access over its hardware circuits 318, 320, 321. As an example, other applications 316 cannot access (e.g., read and/or write) the secure memory circuit 318 and any keys 322, 324 that may be stored within. As another example, the SEE 302 may physically lock down (e.g., disable) any communication lines that couple the secure memory circuit 318 and the secure processing circuit 320 to other, insecure circuitry 304, 306, 308, 310 of the primary mobile device 200. An example of a secure execution environment is TrustZone® by ARM Holdings. According to one aspect, the SEE 302 may not have a dedicated secure processor 320 but instead may utilize the applications processor unit (APU) 301 to execute its processes. Of course, the SEE 302 may have higher privilege access in that it may access the secure memory 318 whereas the HLOS 314 and applications 316 running at the APU 301 may not have such access.

The memory circuit 304 may include volatile and non-volatile memory circuits such as flash memory, dynamic random access memory (DRAM), static random access memory (SRAM), hard disc drives, optical disc drives, and other digital memory storage mediums. The memory circuit 304 may store the code associated with the HLOS 314 and other applications 316.

The display 306 may be any type of display including, but not limited to, an LCD display, a plasma display, a touchscreen display, etc. The I/O devices 308 (e.g., an input interface, an output interface, etc.) may include a mouse, trackball, keyboard, touchscreen display, printer, camera, linear and/or matrix barcode scanner, etc. The communication interface 310 may include a wireless communication interface that can support mobile phone network communication protocols (e.g., cellular network communication protocols) and also short range wireless communication standards such as 802.11, Wi-Fi®, Bluetooth®, Zigbee®, etc. The communication interface 310 may also include wired communication interfaces, and also allows the primary mobile device 200 to communicate (e.g., transmit and receive data) with the secondary display device 202.

The primary mobile device 200 may be configured such that certain actions must be approved by a user of the primary mobile device 200 before they are executed. In particular, approval by the user to proceed with the action directs the secure execution environment 302 or a component thereof, such as the secure processor 320 and/or a secure element, to authorize the action by, for example, signing an approval message associated with the action with a secret key 322. Examples of such actions that may require user approval and secure execution environment 302 authorization include, but are not limited to, financial transactions (e.g., payment requests, fund transfer requests, fund acceptance requests, etc.), data access (e.g., file or folder access requests, document read/write access, file encryption/decryption, etc.), and website login/authentication.

Figure 4:
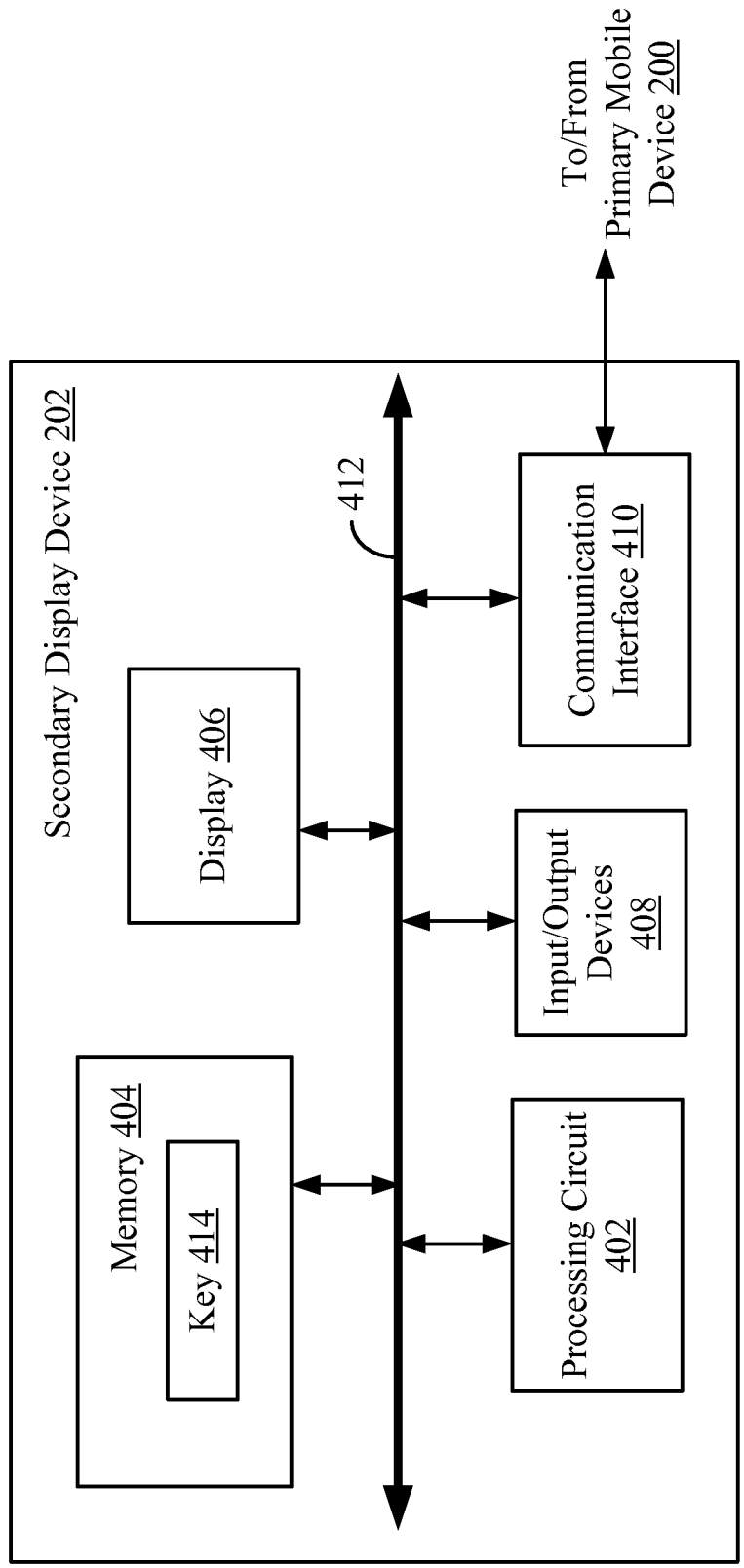
FIG. 4 illustrates a high-level schematic block diagram of a secondary display device.

FIG. 4 illustrates a high-level schematic block diagram of the secondary display device 202 according to one aspect. The secondary display device 202 may include a processing circuit 402 (e.g., processor, etc.), a memory circuit 404, a display 406, input/output (I/O) devices 408, and/or a communication interface 410. The processing circuit 402, the memory circuit 404, the display 406, the I/O devices 408, and/or the communication interface 410 may be communicatively coupled to each other by, for example, a communication bus 412. The memory circuit 404 may store a cryptographic key 414 used to secure transmissions between the secondary display device 202 and the primary mobile device 200.

The processing circuit 402 may execute various instructions stored within the memory circuit 404 including, but not limited to, cryptographic processes that encrypt and/or decrypt messages transmitted between the secondary display device 202 and the primary mobile device 200. The memory circuit 404 may include volatile and non-volatile memory circuits such as, but not limited to, SRAM, DRAM, flash memory, hard disc drives, optical disc drives, and other digital memory storage mediums.

The display 406 may be any type of display including, but not limited to, an LCD display, a plasma display, a touchscreen display, etc. The I/O devices 408 may include a mouse, trackball, keyboard, touchscreen display, printer, etc. The communication interface 410 may include a wireless communication interface that can support short range wireless communication standards such as 802.11, Wi-Fi®, Bluetooth®, Zigbee®, etc. The communication interface 410 may also include wired communication interfaces and/or long range communication interfaces capable of transmitting data over WANs, cellular networks, LANs, etc. The communication interface 410 allows the secondary display device 202 to communicate (e.g., transmit and receive data) with the primary mobile device 200.

Referring to FIGS. 3 and 4, the primary mobile device's display 306 may be considered insecure in that it may be manipulated and controlled by one or more applications 316 resident to the primary mobile device 200. These applications 316 may include rogue applications that have nefarious intentions or purposes. By contrast, the secondary display device's display 406 may be considered secure because it is extremely difficult or impractical for it to be manipulated, controlled, or accessed by the one or more applications 316 resident to the primary mobile device 200. Moreover, assuming the secondary display device 202 is a simpler device than the primary mobile device 200, the secondary display device 200 itself may be considered more secure because it may have limited availability to store and execute third party software, which fortunately provides limited opportunity for the device 200 to store or execute nefarious third party code.

Figure 5:
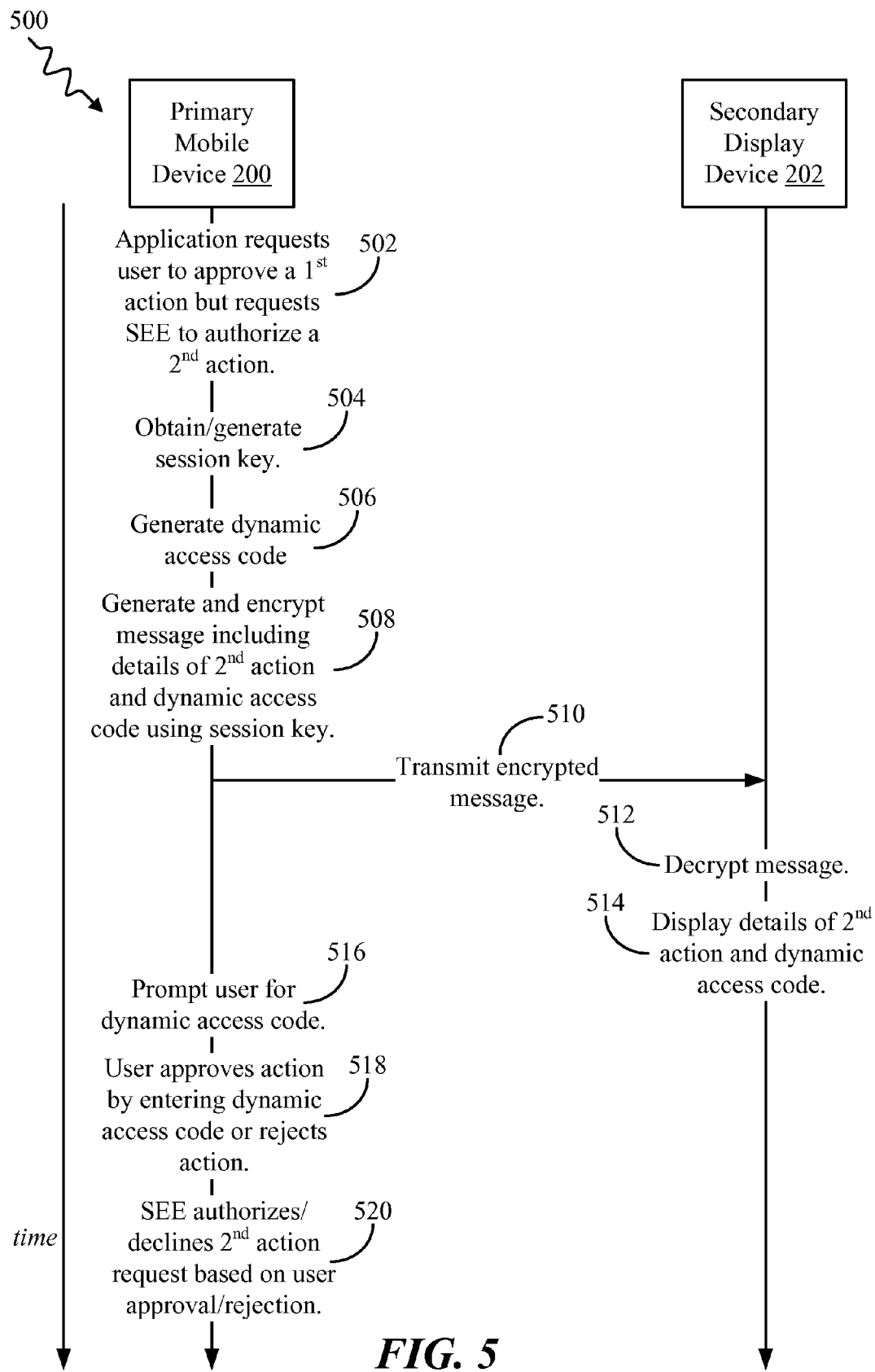
FIG. 5 illustrates a process flow diagram of a first exemplary security protocol between a primary mobile device and a secondary display device.

FIG. 5 illustrates a process flow diagram 500 of a security protocol between the primary mobile device 200 and the secondary display device 202 according to one aspect of the disclosure. Referring to FIGS. 3, 4, and 5, it may be assumed that an application 316 that is resident on the primary mobile device 200 is a rogue application having nefarious intentions. Specifically, the application 316 is seeking to trick the user of the primary mobile device 200 to approve a first action (e.g., a financial transaction, data access, website/URL access, file encryption/decryption, etc.) that unbeknownst to the user causes the primary mobile device 200 (e.g., the SEE 302) to authorize a second action that is different than the first action.

Accordingly referring to FIGS. 3, 4, and 5, the process begins when the application 316 causes the display 306 of the primary mobile device 200 to show details concerning a first action for approval/rejection by the user. At about the same time, however, the application 316 requests 502 that the SEE 302 authorize a different, second action. As one non-limiting example, the first action may be a request for the transfer of funds in the amount of $5 but the second action may be a request for the transfer of $500. Thus, approval of the $5 first action by the user (e.g., by selecting "OK," "Approve," etc.) may unwittingly cause the SEE 302 to authorize the unintended $500 second action.

The primary mobile device 200 (e.g., the secure processor 320) may then obtain and/or generate 504 a session key 324. The primary mobile device 200 (e.g., the secure processor 320) may also generate 506 a dynamic access code that is unique and different for each action requested by the application. The dynamic access code may be, for example, a number code, an alphanumeric code, a drawing, a symbol, a picture, an icon, a linear barcode, a matrix barcode, and/or a combination of the aforementioned types. For simplicity and clarity many of the examples described below may assume the dynamic access code to be an alphanumeric code but any type of code, including the aforementioned types, may be used.

The primary mobile device 200 (e.g., the secure processor 320) may then generate 508 a message that includes details of the second action requested (e.g., the $500 fund transfer request) and also the dynamic access code generated. The message may be encrypted 508 using the session key 324. The primary mobile device 200 (e.g., the secure processor 320 in combination with the communication interface 310) may then transmit 510 the encrypted message to the secondary display device 202. The encrypted message may be transmitted to the secondary display device 202 through short range communication protocols such as Bluetooth®, Zigbee®, or many other short range communication protocols. In some aspects, the encrypted message may be transmitted by indirect and/or long range means such as through a cellular network, local area network including access points, wide area network, etc.

The secondary display device 202 (e.g., the processing circuit 402) may decrypt 512 the encrypted message received and then display 514 details of the second action requested and the dynamic access code to the user on its display 406. The user is now able to see details concerning the actual action that the application 316 requested authorization of by the SEE 302. In the example given above, the user is now able to see that a $500 fund transfer request was sent to the SEE 302 for authorization even though the display 306 of the primary mobile device 200 shows only a $5 fund transfer request.

At some point after the dynamic access code has been generated 506, the primary mobile device (e.g., the SEE 302) prompts 516 the user of the primary mobile device 200 to enter in the dynamic access code in order to approve the second action requested. For example, the primary mobile device 200 (e.g., the SEE 302) may prompt 516 the user a short time after transmitting 510 the encrypted message to the secondary display device 202. The user may then choose to proceed 518 with the second action (i.e., approve the second action) being requested by manually entering in the dynamic access code associated with the second action into the primary mobile device 200 (e.g., using the I/O devices 308) or reject the second action by not entering in the dynamic access code (e.g., selecting "Cancel," "Reject," etc.). In the case where the dynamic access code displayed 514 on the secondary display device 202 is a linear or matrix barcode, the user may choose to proceed 518 with the second action being requested by scanning the barcode displayed on the secondary display device 202 with the primary mobile device 200 in order for the primary mobile device 200 to receive the displayed 514 barcode data. In addition to entering the dynamic access code, the user may optionally also provide biometric data (e.g., finger print, retinal scan, facial image capture, etc.) to approve the second action requested.

Based on the user's decision to approve or reject the second action, the SEE 302 authorizes or declines 520 the second action requested. For example, if the user enters in or scans the correct dynamic access code corresponding to the second action requested, the SEE 302 may authorize the second action requested by, for example, performing a cryptographic operation using one of its secret keys 322. An example of such a cryptographic operation may include providing a signature signed using the appropriate secret key 322. In one case, if the second action requested is related to a financial transaction, the payment request message submitted to the SEE 302 by the application 316 may be signed using a secret key 322 associated with the bank and/or finance entity related to the financial transaction. In another case, if the second action requested is related to logging into and/or visiting a website, a message containing the website's URL link may be submitted to the SEE 302 by the application 316 for the SEE 302 to sign using the appropriate secret key 322 (e.g., client authentication such as, for example, authentication standards promulgated by the FIDO™ alliance). According to another case, if the second action requested is related to file encryption/decryption the SEE 302 may encrypt/decrypt the specific files requested for encryption/decryption using one or more of the secret keys 322.

Figure 6:
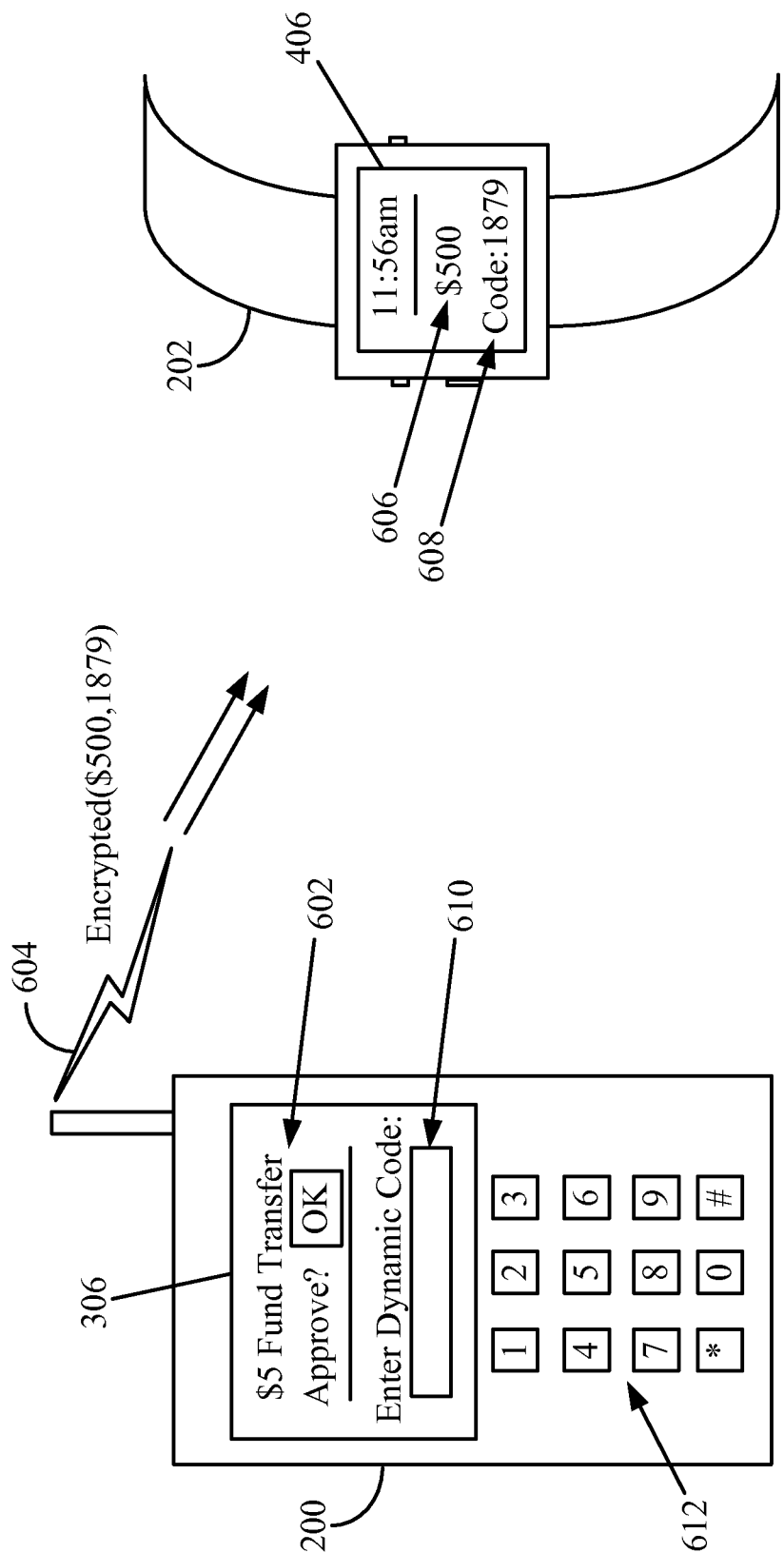
FIG. 6 illustrates an example of a security protocol where actions requested by an application are related to financial transactions.

FIG. 6 illustrates an example of the security protocol described above with respect to FIG. 5 for the case where the actions requested by the application are related to financial transactions. In this case it may be assumed that the rogue application 316 running at the primary mobile device 200 is requesting that the user approve a $5 fund transfer (e.g., the first action) but at about the same time the application 316 sends a request to the SEE 302 at the primary mobile device 200 to authorize a $500 fund transfer (e.g., the second action). Consequently, as shown in FIG. 6, the application 316 causes the display 306 of the primary mobile device 200 to nefariously show that the fund transfer request 602 is only for $5 along with a request asking the user to approve the fund transfer (e.g., by selecting "OK"). The user is unaware that the application 316 has sent a request to the SEE 302 asking that $500 funds be transferred instead because such a request typically can't be seen by the user. Ordinarily, without the presently disclosed security protocol in place, if the user mistakenly selects "OK" the user may inadvertently cause the SEE 302 authorize the $500 fund transfer instead of the intended $5 fund transfer. According to one aspect, security protocols described herein prevent that from happening.

After the SEE 302 receives the request for the $500 fund transfer, it generates a dynamic access code associated with the $500 fund transfer request and sends an encrypted message 604 including one or more details of the $500 fund transfer request (e.g., amount, source account, destination account, and/or requesting party, etc.) and the dynamic access code to the secondary display device 202. The secondary display device 202 receives the encrypted message and decrypts it. It then displays the details of the $500 fund transfer request 606 and the dynamic access code 608 on its display 406. Since the display 406 of the secondary display device 202 cannot be easily controlled by the application 316 resident on the primary mobile device 200, the user can better trust that the amount of the transaction shown on the secondary mobile device's display 406 is the real amount the SEE 302 has been asked to authorize. In the example shown in FIG. 6, the dynamic access code 608 shown in a number, however, in other aspects the dynamic access code 608 may be an alphanumeric code, a drawing, a symbol, a picture, an icon, a linear barcode, and/or a matrix barcode. In the event it is a linear or matrix barcode the primary mobile device 200 may scan the barcode to retrieve the barcode related data. In addition to entering the dynamic access code 608, the user may optionally also provide biometric data (e.g., finger print, retinal scan, facial image capture, etc.) to approve the second action requested 602.

At about this time the primary mobile device 200 may prompt the user for the dynamic access code 610. The user can then enter in the dynamic access code (in this case "1879") into the primary mobile device 200 using the I/O device 308 (e.g., keypad 612) if they choose to approve the transaction or if not they can simply cancel the transaction or not enter in the dynamic access code. In the example illustrated in FIG. 6, since the $5 amount originally shown in the primary mobile device's display 306 is substantially different than the actual $500 amount requested at the SEE 302, it may be assumed that the user will reject/cancel the transaction request thereby thwarting the nefarious application's 316 illegitimate attempt to transfer a greater amount than intended by the user.

In the illustrated example of FIG. 6, the primary mobile device 200 is a smartphone but as described above the device 200 may include other electronic communication devices (e.g., laptop, desktop, tablet, etc.). Similarly, in the example shown, the secondary display device 202 is a smartwatch but as described above the secondary display device 202 may include other electronic communication devices having a display (e.g., head-mounted display glasses, etc.).

Figure 7:
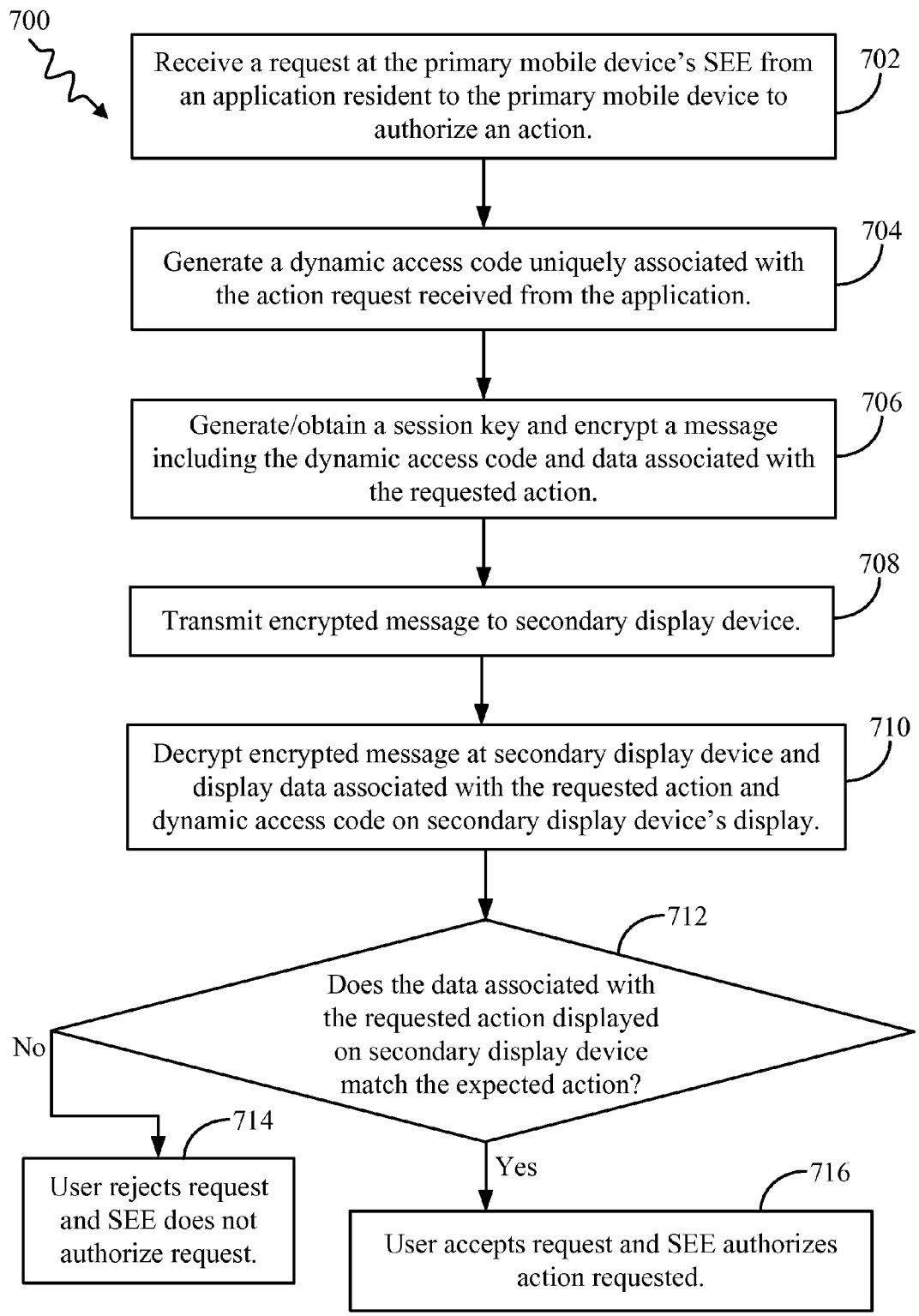
FIG. 7 illustrates a process flow diagram of a second exemplary security protocol between a primary mobile device and a secondary display device.

FIG. 7 illustrates a flow diagram 700 of a security protocol between a primary mobile device and a secondary display device according to one aspect of the disclosure. The SEE of the primary mobile device receives 702 a request from an application resident to the primary mobile device to authorize an action. The SEE may then generate 704 a dynamic access code uniquely associated with the action received from the application. The primary mobile device (e.g., the SEE) may then generate/obtain 706 a session key and encrypt a message that includes data associated with the requested action and also the dynamic access code. The encrypted message is then transmitted 708 from the primary mobile device to the secondary display device. The secondary display device then decrypts 710 the encrypted message and displays on its display the data associated with the requested action along with the associated dynamic access code. A decision is then made as to whether the data associated with the requested action displayed on the secondary display device matches 712 or is consistent with an action expected by the user. If not, the user may then reject 714 the request causing the SEE to decline (not authorize) the action requested by the application. If yes, the user may then accept 716 the request causing the SEE to authorize the action requested by the application.

Figure 8:
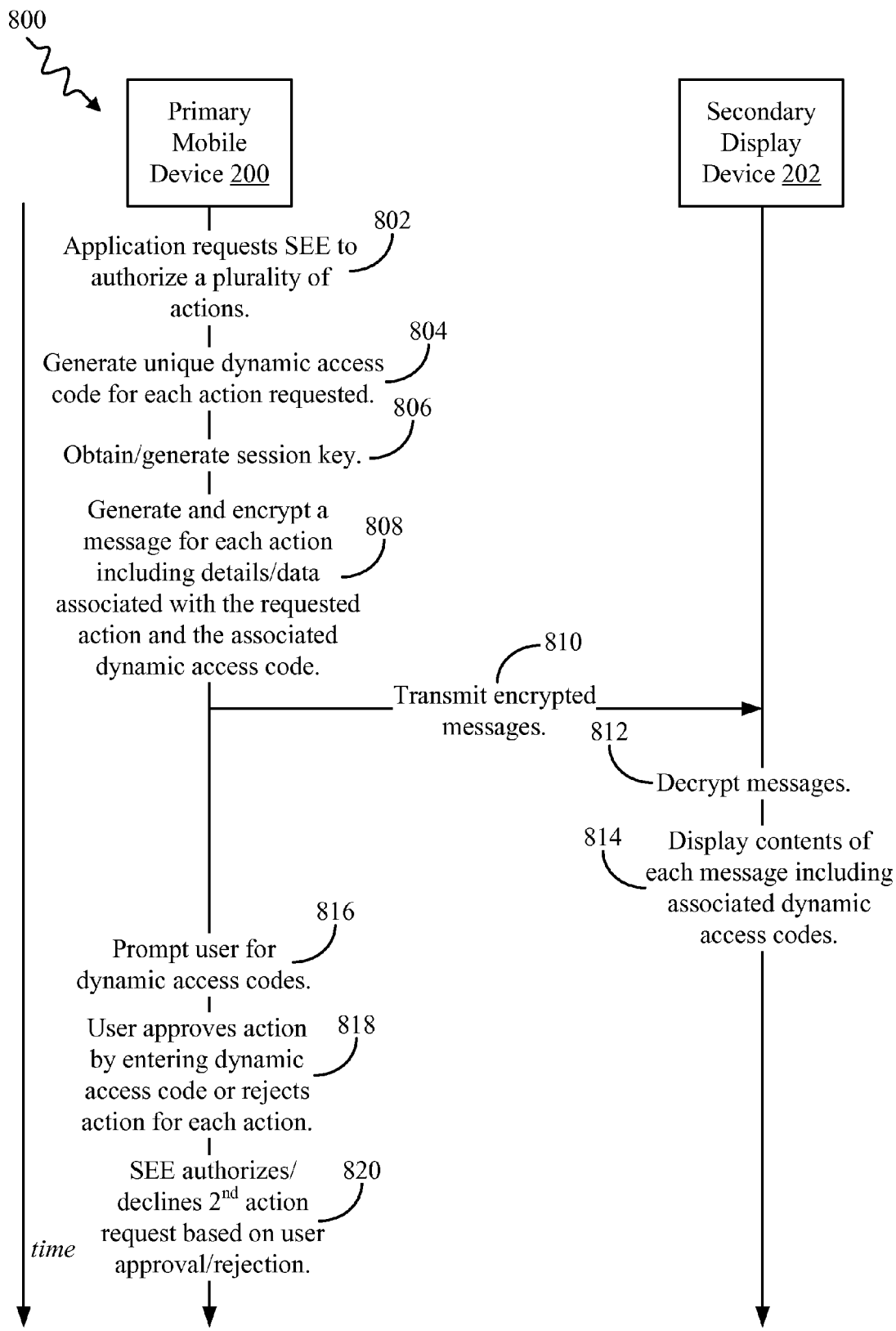
FIG. 8 illustrates a process flow diagram of a third exemplary security protocol between a primary mobile device and a secondary display device.

FIG. 8 illustrates a process flow diagram 800 of a security protocol between the primary mobile device 200 and the secondary display device 202 according to one aspect of the disclosure. Referring to FIGS. 3, 4, and 8, a rogue application 316 is seeking to trick the user of the primary mobile device 200 to approve a plurality of actions (e.g., a financial transaction, data access, website/URL access, encrypt/decrypt one or more files, etc.) shown to the user on the display 306 that unbeknownst to the user causes the primary mobile device 200 (e.g., the SEE 302) to authorize a plurality of other actions that are different than those actions shown on the display 306.

Accordingly referring to FIGS. 3, 4, and 8, the process begins when the application 316 sends 802 a plurality of requests to the primary mobile device's SEE 302 each seeking authorization of a different action. The application 316 may at about the same time cause or attempt to cause the display 306 of the primary mobile device 200 to show requests to approve actions different than the ones sent to the SEE 302. After receiving the requests at the SEE 302, the primary mobile device 200 (e.g., the secure processor 320) may then generate 804 and associate a unique dynamic access code for each action that the application 316 requested authorization for. At least one session key 324 may also be obtained or generated 806 by the primary mobile device 200 (e.g., the secure processor 320).

The primary mobile device 200 (e.g., the secure processor 320) may then generate and encrypt 808 a plurality of messages that includes a message for each action that contains details of the action requested and the dynamic access code associated with the action. The message may be encrypted using the session key 324. The primary mobile device 200 (e.g., the secure processor 320 in combination with the communication interface 310) may then transmit 810 the encrypted messages to the secondary display device 202. The encrypted messages may be transmitted to the secondary display device 202 through short range communication protocols such as Bluetooth®, Zigbee®, and many other short range communication protocols. In some aspects, the encrypted message may be transmitted by indirect and/or long range means such as through a cellular network, local area network including access points, wide area network, etc.

The secondary display device 202 (e.g., the processing circuit 402) may then decrypt 812 the encrypted message received and then display 814 details of the each action requested and the dynamic access code associated with each action to the user on its display 406. The user is now able to see details concerning each action that the application 316 requested authorization of by the SEE 302 along with the unique dynamic access code associated with each action that the user can utilize to approve the action.

The primary mobile device (e.g., the SEE 302) may then prompt 816 the user of the primary mobile device 200 to enter in the dynamic access codes associated with those actions that the user wishes to approve. According to one non-limiting, non-exclusive example, the primary mobile device 200 (e.g., the SEE 302) may prompt 816 the user for the dynamic access codes a short time after transmitting 810 the encrypted message to the secondary display device 202. The user may then choose to proceed/approve 818 an action by manually entering in the dynamic access code associated with the action into the primary mobile device 200 (e.g., using the I/O devices 308) or reject the second action by not entering in the dynamic access code (e.g., selecting "Cancel," "Reject," etc.). The user may do this one by one for each action they wish to approve. If the details of any one of the actions shown to the user on the secondary display device's display 406 do not coincide or match the action expected the user may choose to cancel and reject that specific action by not entering in the dynamic access code associated with that action. In the event the dynamic access code is a linear or matrix barcode, the primary mobile device 200 may scan the barcode to retrieve the barcode related data instead of the user manually entering in a code. In addition to providing the dynamic access code, the user may optionally also provide biometric data (e.g., finger print, retinal scan, facial image capture, etc.) to approve each action requested.

Based on the user's decision to approve or reject the actions, the SEE 302 authorizes or declines 820 the actions requested. Authorization of an action by the SEE 302 may include providing a signature for the action having been signed using the secret key 322.

In this fashion, the process described above with respect to FIG. 8 allows a user to discern between multiple requests for actions submitted to the SEE 302 that may be submitted close in time to one another. This way a user may avoid accidentally approving an action submitted to the SEE 302 that is different than an action shown on the primary mobile device's display 306. Since each action submitted to the SEE 302 has a unique dynamic access code associated with it, a user approving an action by manually entering in the dynamic access code associated with it can be confident that the SEE 302 will execute the correct action and not another action that was submitted to it by the application 316 around the same time.

Figure 9:
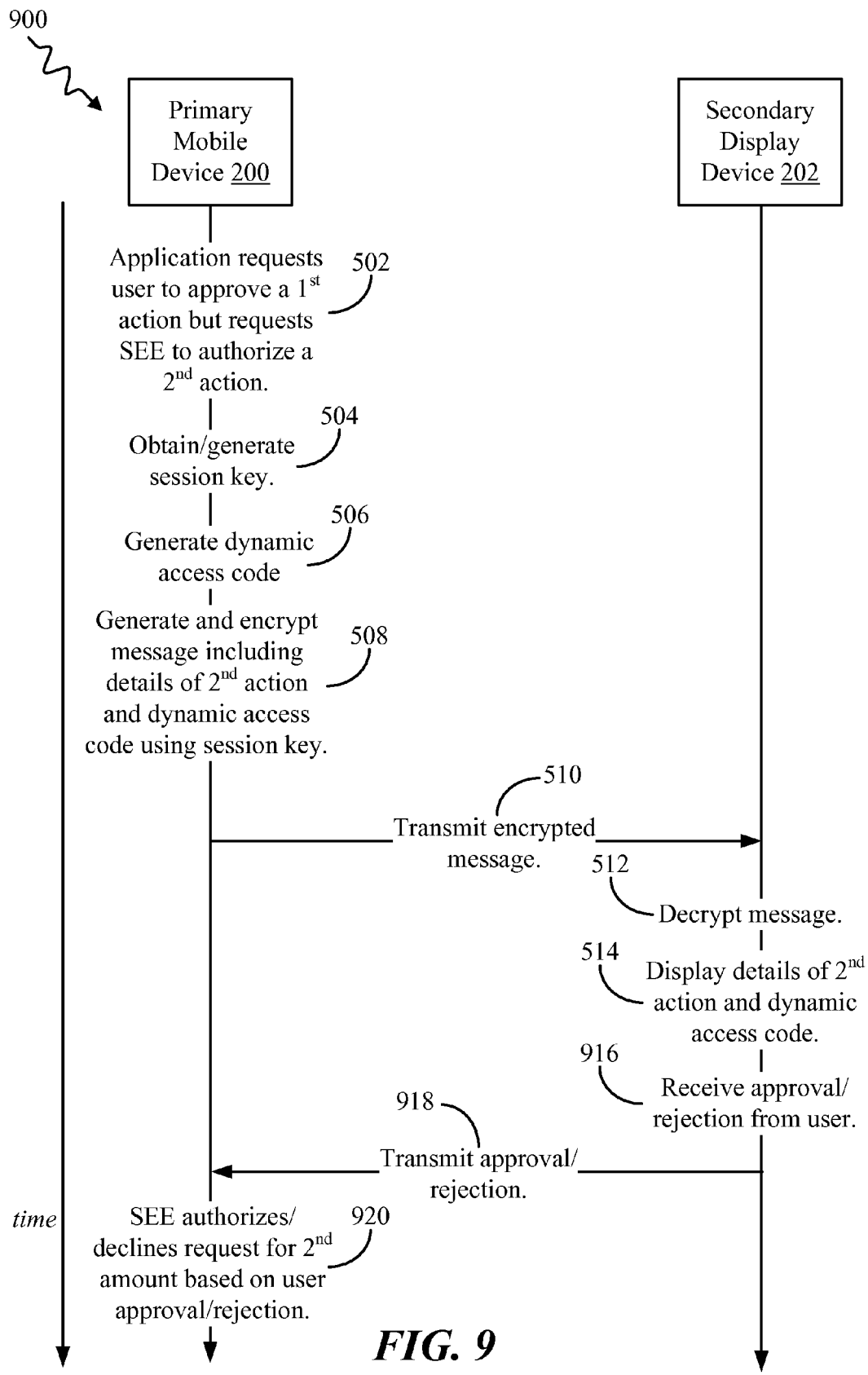
FIG. 9 illustrates a process flow diagram of a fourth exemplary security protocol between a primary mobile device and a secondary display device.

FIG. 9 illustrates a process flow diagram 900 of a security protocol between the primary mobile device 200 and the secondary display device 202 according to one aspect of the disclosure. Referring to FIGS. 3, 4, 5, and 9, the process 900 shown in FIG. 9 is the same as the process 500 shown in FIG. 5, except that the secondary display device 202 may receive the user's approval or rejection 916 instead of the user entering the dynamic access code into the primary mobile device 200. For example, after the secondary display device's display 406 displays 514 the details of the second action and the associated dynamic access code, the user may approve 916 the second action by entering in the dynamic access code as shown on the display 406 into an I/O device 408 (e.g., touchscreen, keypad, etc.) of the secondary display device 202. The user may reject 916 the second action by not entering the dynamic access code or simply selecting "cancel action" or the like on the secondary display device 202. Once the user's approval/rejection 916 is received, the secondary display device 202 may transmit 918 the approval or rejection back to the primary mobile device 200. The transmission back to the primary mobile device 200 may also be encrypted using the session key 324, which may also be generated and/or stored at the secondary display device 202 (e.g., memory circuit 404). The primary mobile device's SEE 302 may then authorize or decline 920 the request submitted by the application 316 based on the user's received approval/rejection.

Figure 10:
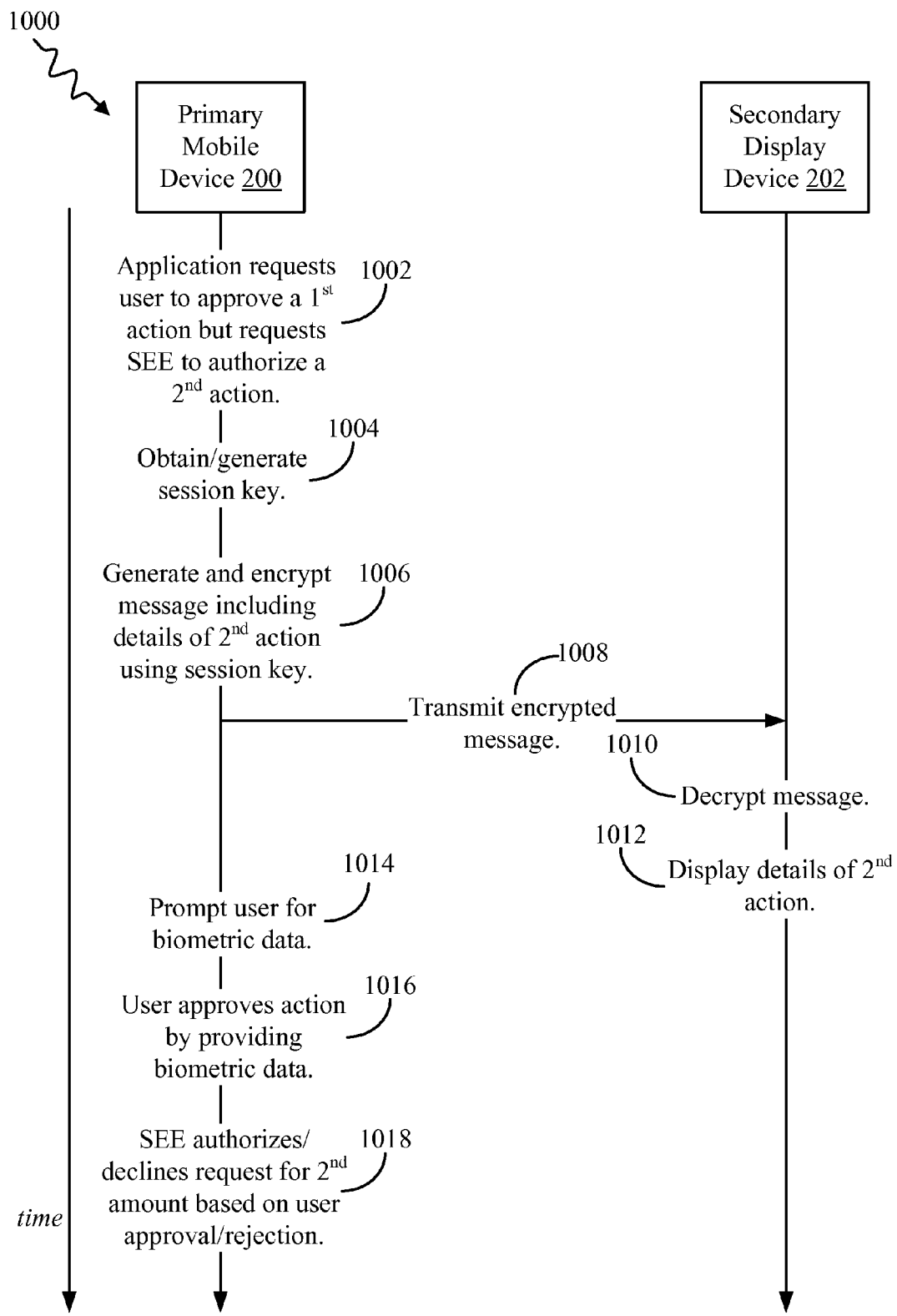
FIG. 10 illustrates a process flow diagram of a security protocol between a primary mobile device and a secondary display device.

FIG. 10 illustrates a process flow diagram 1000 of a security protocol between the primary mobile device 200 and the secondary display device 202 according to one aspect of the disclosure. Referring to FIGS. 3, 4, and 10, it may be assumed that an application 316 that is resident on the primary mobile device 200 is a rogue application having nefarious intentions. Specifically, the application 316 may attempt to have the user of the primary mobile device 200 approve a first action (e.g., a financial transaction, data access, website/URL access, file encryption/decryption, etc.) that unbeknownst to the user causes the primary mobile device 200 (e.g., the SEE 302) to authorize a second action that is different than the first action.

Accordingly referring to FIGS. 3, 4, and 10, the process begins when the application 316 causes the display 306 of the primary mobile device 200 to show details concerning a first action for approval/rejection by the user. At about the same time, however, the application 316 requests 1002 that the SEE 302 authorize a different, second action. As one non-limiting example, the first action may be a request for the transfer of funds in the amount of $5 but the second action may be a request for the transfer of $500. Thus, approval of the $5 first action by the user (e.g., by selecting "OK," "Approve," etc.) may unwittingly cause the SEE 302 to authorize the unintended $500 second action.

The primary mobile device 200 (e.g., the secure processor 320) may then obtain and/or generate 1004 a session key 324. The primary mobile device 200 (e.g., the secure processor 320) may then generate 1006 a message that includes details of the second action requested, and encrypt 1006 the message using the session key 324. The primary mobile device 200 (e.g., the secure processor 320 in combination with the communication interface 310) may then transmit 1008 the encrypted message to the secondary display device 202. The encrypted message may be transmitted to the secondary display device 202 through short range communication protocols such as Bluetooth®, Zigbee®, or many other short range communication protocols. In some aspects, the encrypted message may be transmitted by indirect and/or long range means such as through a cellular network, local area network including access points, wide area network, etc.

The secondary display device 202 (e.g., the processing circuit 402) may decrypt 1010 the encrypted message received and then display 1012 details of the second action requested to the user on its display 406. The user is now able to see details concerning the actual action that the application 316 requested authorization of by the SEE 302. The primary mobile device (e.g., the SEE 302) may then prompt 1014 the user of the primary mobile device 200 to provide their biometric data in order to approve the second action requested. The biometric data may include, but is not limited to, a scan of the user's fingerprint, retina, voice, facial image, etc. For example, the primary mobile device 200 (e.g., the SEE 302) may prompt 1014 the user a short time after transmitting 1008 the encrypted message to the secondary display device 202. The user may then choose to approve/proceed 1016 with the second action being requested by providing the biometric data to the primary mobile device 200 (e.g., using the I/O devices 308) or reject the second action by not providing the biometric data (e.g., selecting "Cancel," "Reject," etc.).

Based on the user's decision to approve or reject the second action, the SEE 302 authorizes or declines 1018 the second action requested. For example, if the user provides the biometric data, the SEE 302 may authorize the second action requested by, for example, performing a cryptographic operation using one of its secret keys 322. An example of such a cryptographic operation may include providing a signature signed using the appropriate secret key 322. In one case, if the second action requested is related to a financial transaction, the payment request message submitted to the SEE 302 by the application 316 may be signed using a secret key 322 associated with the bank and/or finance entity related to the financial transaction. In another case, if the second action requested is related to logging into and/or visiting a website, a message containing the website's URL link may be submitted to the SEE 302 by the application 316 for the SEE 302 to sign using the appropriate secret key 322 (e.g., client authentication such as, for example, authentication standards promulgated by the FIDO™ alliance). According to another case, if the second action requested is related to file encryption/decryption the SEE 302 may encrypt/decrypt the specific files requested for encryption/decryption using one or more of the secret keys 322.

Figure 11:
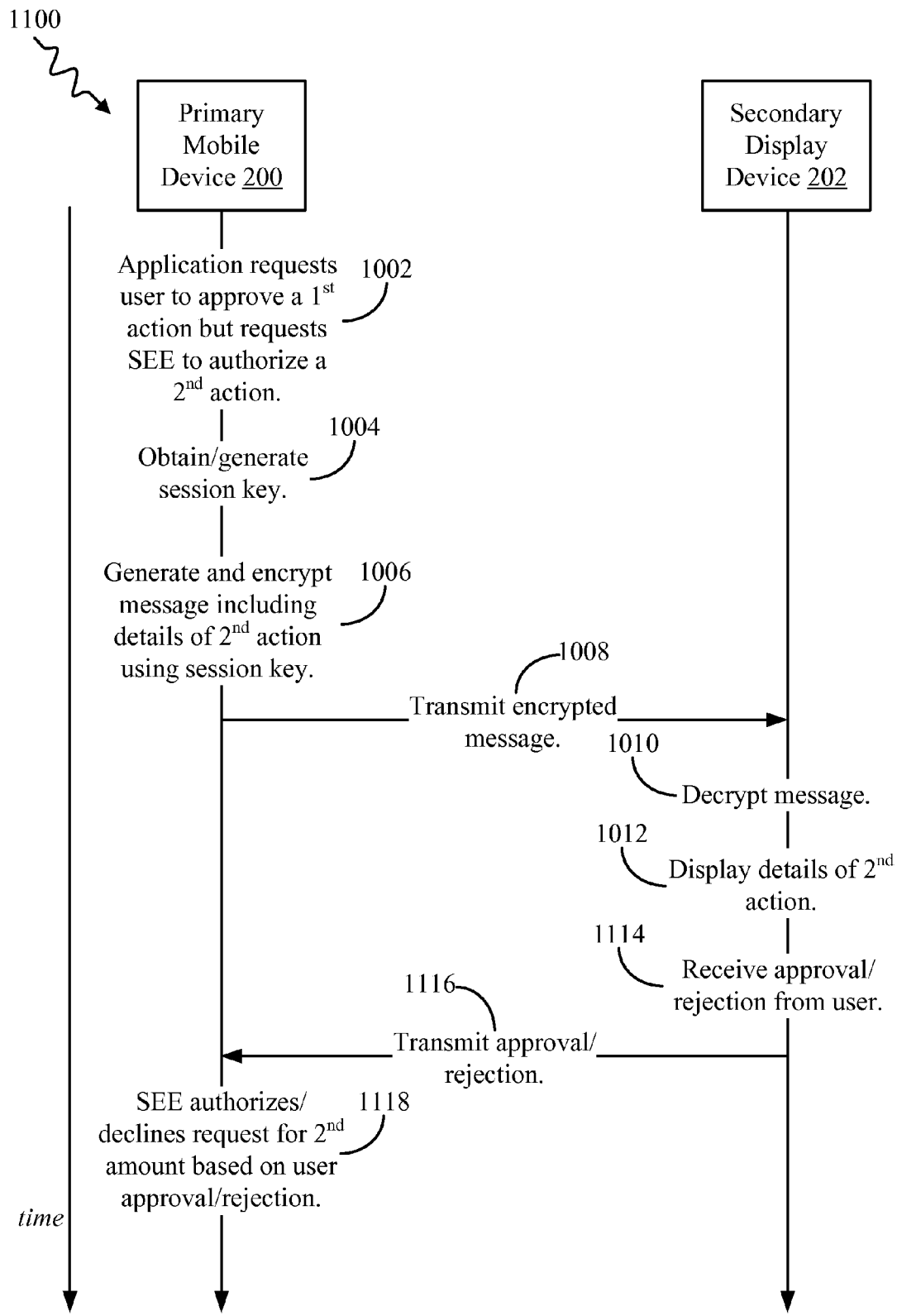
FIG. 11 illustrates a process flow diagram of a sixth exemplary security protocol between a primary mobile device and a secondary display device.

FIG. 11 illustrates a process flow diagram 1100 of a security protocol between the primary mobile device 200 and the secondary display device 202 according to one aspect of the disclosure. Referring to FIGS. 3, 4, 10, and 11, the process 1100 shown in FIG. 11 is the same as the process 1000 shown in FIG. 10, except that the secondary display device 202 may receive the user's approval or rejection 1114 instead of the user providing biometric data to the primary mobile device 200. For example, after the secondary display device's display 406 displays 1012 the details of the second action, the user may approve 1114 the second action by selecting "OK," "Accept," "Approve," etc. directly into an I/O device 408 (e.g., touchscreen, keypad, etc.) of the secondary display device 202. In an alternative aspect, the user may provide biometric data to an I/O device 408 of the secondary display device 202 in order to approve 1114 the second action. The user may reject 1114 the second action by simply selecting "cancel action" or the like on the secondary display device 202.

Once the user's approval/rejection 1114 is received, the secondary display device 202 may transmit 1116 the approval or rejection back to the primary mobile device 200. The transmission back to the primary mobile device 200 may also be encrypted using the session key 324, which may also be generated and/or stored at the secondary display device 202 (e.g., memory circuit 404). The primary mobile device's SEE 302 may then authorize or decline 1118 the request submitted by the application 316 based on the user's received approval/rejection.

In the examples shown and described above with respect to FIGS. 5, 6, 7, 8, 9, 10, and 11, it may be assumed that the application 316 is resident to the primary mobile device 200. In other aspects, the nefarious application 316 may be resident to another server and/or device. For example, the nefarious application 316 may be resident to a server that hosts a websites. In such a case the application 316 resident to the server may also alter the display 306 of the primary mobile device 200 to display a request to perform a first action but request the primary mobile device's SEE 302 to authorize a different second action. In one case, the application 316 may be resident to the primary mobile device 200 and be associated with a third party server 200 that is trusted (e.g., secure and/or known not have illegitimate or nefarious intentions concerning the primary mobile device 200), however, the application 316 may not be trusted. In another case, the primary mobile device 200 may be communicating with a point of sale (POS) device (e.g., a POS at a physical merchant's outlet). The primary mobile device 200 may include an application 316 that is associated with the POS and resident to the primary mobile device 200. The POS may be a trusted device but the application 316 associated with the POS may not be trusted.

Figure 12:
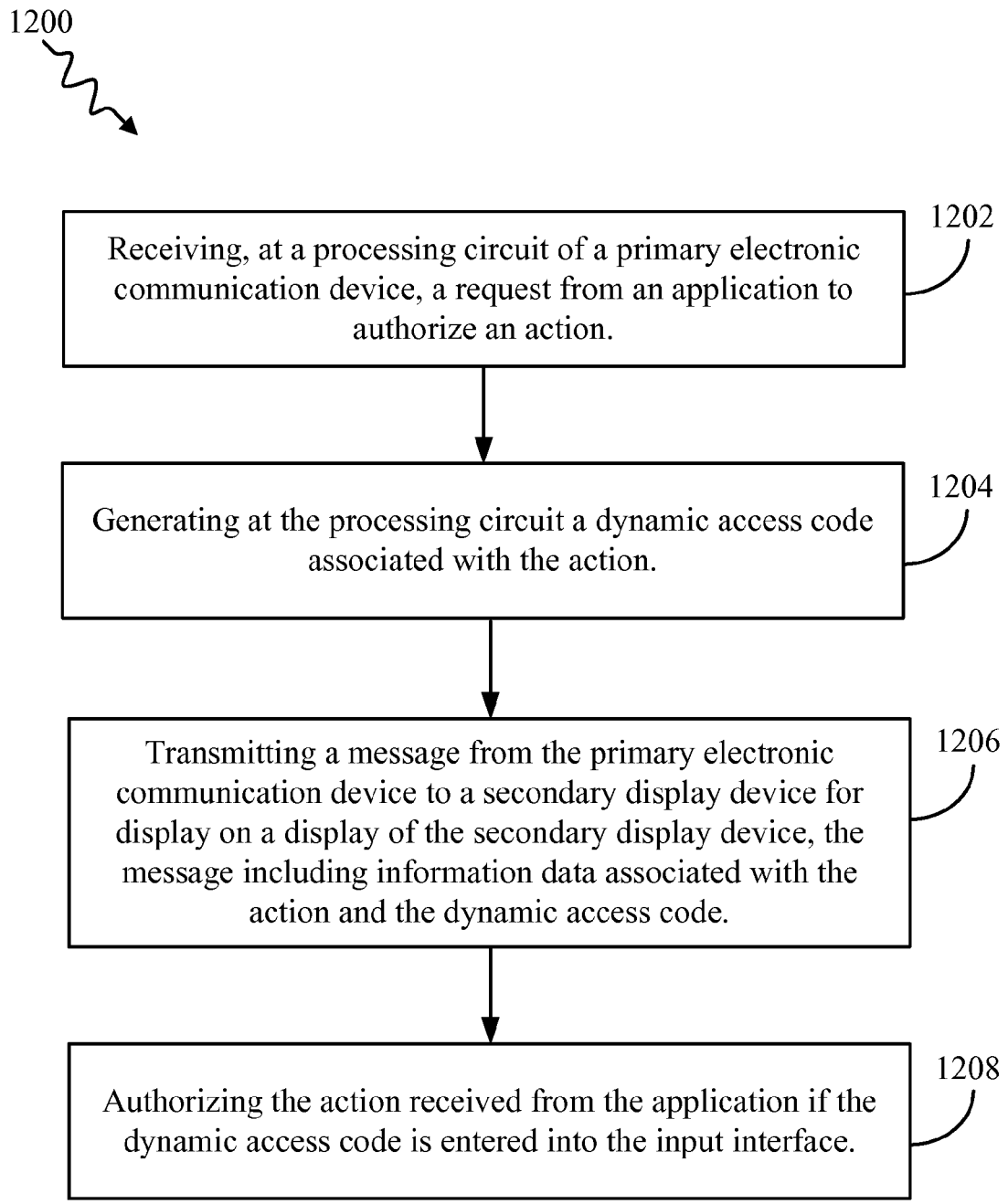
FIG. 12 illustrates a first exemplary method operational at a primary electronic communication device for secure display on a secondary display device.

FIG. 12 illustrates a method 1200 operational at a primary electronic communication device for secure display on a secondary display device according to one aspect of the disclosure. First, a request is received 1202 from an application at a processing circuit of a primary electronic communication device to authorize an action. Next, a dynamic access code associated with the action is generated 1204 at the processing circuit. Then, a message is transmitted 1206 from the primary electronic communication device to a secondary display device for display on a display of the secondary display device, where the message includes information data associated with the action and the dynamic access code. Next, the action received 1208 from the application is authorized if the dynamic access code is entered into the input interface.

Figure 13:
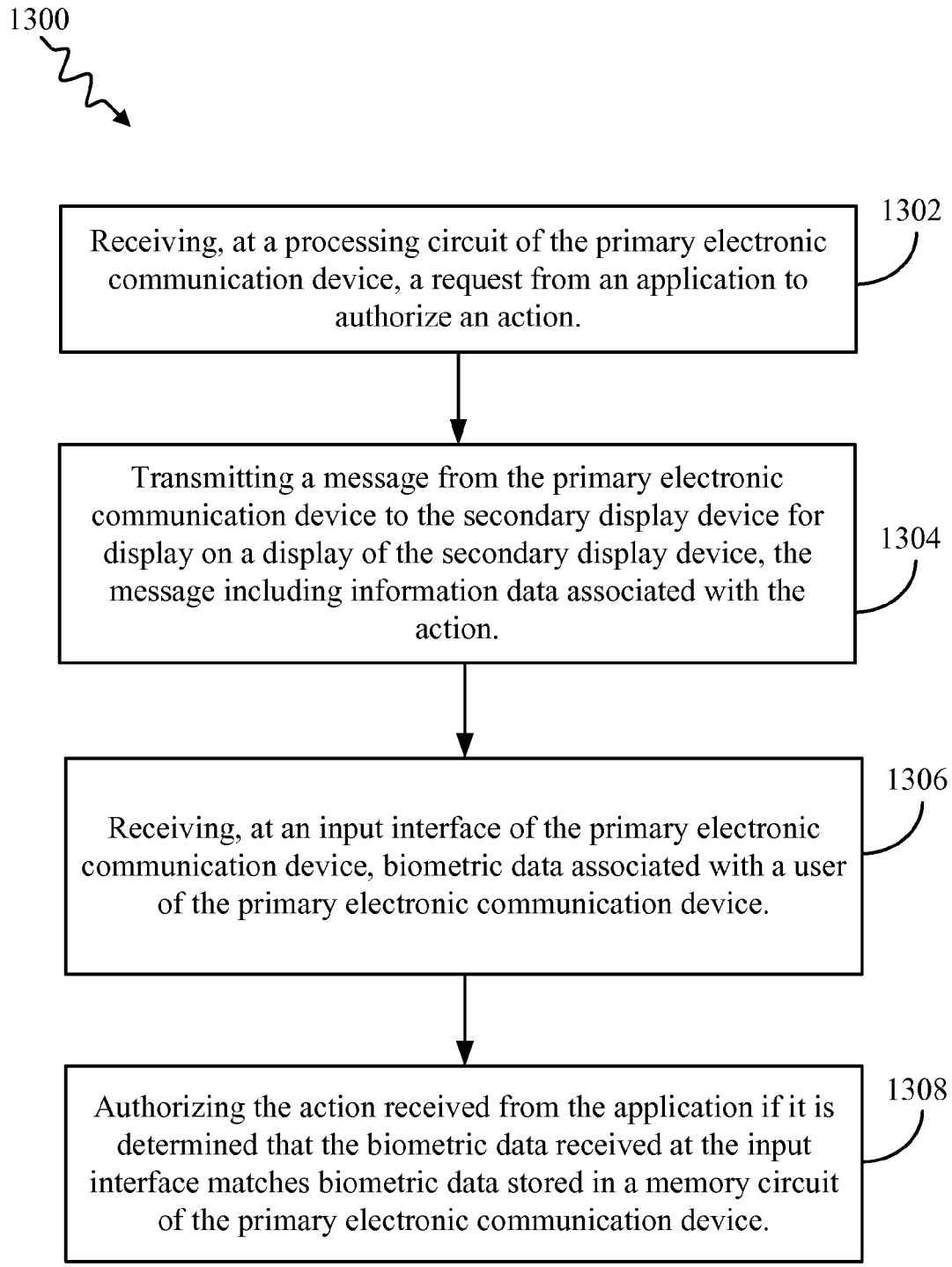
FIG. 13 illustrates a second exemplary method operational at a primary electronic communication device for secure display on a secondary display device.

FIG. 13 illustrates a method 1300 operational at a primary electronic communication device for secure display on a secondary display device according to one aspect of the disclosure. First, a request is received 1302 from an application at a processing circuit of a primary electronic communication device to authorize an action. Next, a message is transmitted 1304 from the primary electronic communication device to the secondary display device for display on a display of the secondary display device, where the message includes information data associated with the action. Then, biometric data associated with a user of the primary electronic communication device is received 1306 at an input interface of the primary electronic communication device. Next, the action received from the application is authorized 1308 if it is determined that the biometric data received at the input interface matches biometric data stored in a memory circuit of the primary electronic communication device.

Figure 14:
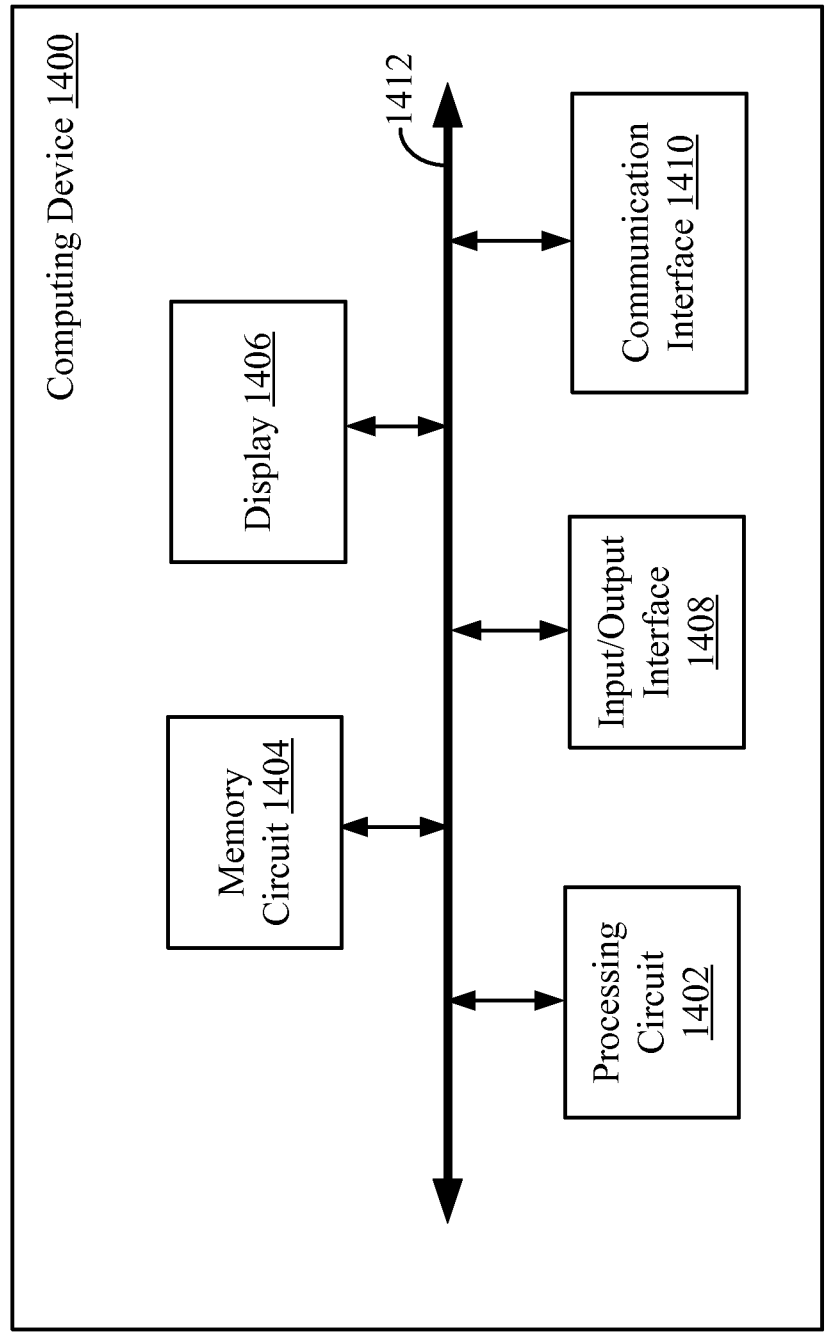
FIG. 14 illustrates a schematic block diagram of a first exemplary computing device.

FIG. 14 illustrates a schematic block diagram of a first exemplary computing device 1400 according to one aspect of the disclosure. The computing device 1400 may be the primary electronic communication device 200 described above. The computing device 1400 may include a processing circuit 1402, a memory circuit 1404, a display 1406, input/output (I/O) interface 1408, and a communication interface 1410 all communicatively coupled to each other via a communication bus 1412.

The I/O interface 1408 is adapted to receive a dynamic access code entered in manually by the user. The communication interface 1410 is adapted to transmit and receive data to and from a secondary display device. According to one aspect, the processing circuit 1402, may be a secure processor and/or secure element that is part of a secure execution environment. According to another aspect, the processing circuit 1402 may be an applications processor that may or may not be secure and may be adapted to execute general applications (e.g., application 316 in FIG. 3) and/or the HLOS 314 (see FIG. 3). The processing circuit 1402 is adapted to: receive a request from an application to authorize an action; generate a dynamic access code associated with the action; transmit a message to a secondary display device for display on a display of the secondary display device, where the message includes information data associated with the action and the dynamic access code; and authorize the action received from the application if the dynamic access code is entered into the input interface.

The communication interface 1410 may be just one example of a means for receiving a request from an application to authorize an action. The communication interface 1410 may also be just one example of a means for transmitting a message from the computing device to the secondary display device for display on a display of the secondary display device. The communication interface 1410 may additionally be a means for receiving biometric data associated with a user of the computing device.

Figure 15:
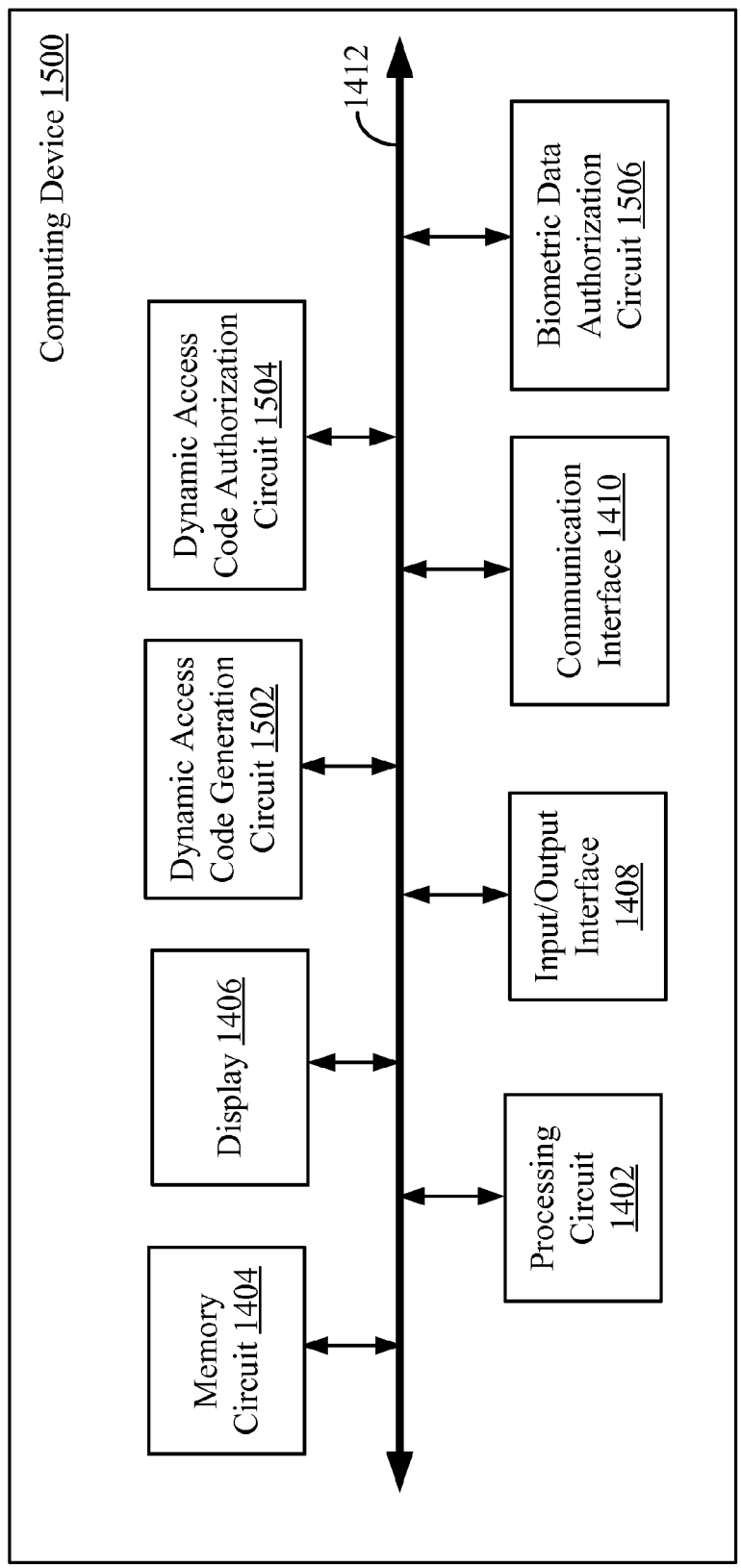
FIG. 15 illustrates a schematic block diagram of a second exemplary computing device.

FIG. 15 illustrates a schematic block diagram of a second exemplary computing device 1500 according to one aspect of the disclosure. The computing device 1500 may include one or more of the components/circuits 1402, 1404, 1406, 1408, 1410 of the computing device 1400 shown in FIG. 14, and may additionally include a dynamic access code generation circuit 1502, a dynamic access code authorization circuit 1504, and/or a biometric data authorization circuit 1506.

The dynamic access code generation circuit 1502 may be a special circuit that is hard wired (e.g., an application specific integrated circuit (ASIC)) to generate a dynamic access code associated with an action that an application has requested authorization for by the dynamic access code authorization circuit 1504. Thus, the dynamic access code generation circuit 1502 may be one example of a means for generating a dynamic access code associated with an action. The dynamic access code authorization circuit 1504 may also be a special circuit that is hard wired (e.g., ASIC) to authorize the action requested from the application if the dynamic access code is correctly entered into the input interface 1408 of the computing device. Thus, the dynamic access code authorization circuit 1504 may be one example of a means for authorizing the action received from the application if the dynamic access code is entered into an input interface of the computing device.

The biometric data authorization circuit 1506 may also be a special circuit that is hard wired (e.g., ASIC) to authorize the action requested from the application if the biometric data received at the input interface 1408 matches biometric data stored in the memory circuit 1404. Thus, the biometric data authorization circuit 1506 may be one example of a means for authorizing the action received from the application if it is determined that the biometric data received at the input interface matches biometric data stored in the memory circuit.

One or more of the components, steps, features, and/or functions illustrated in FIGS. 2, 3, 4, 5, 6, 7, 8, 9, 10, 11, 12, 13, 14, and/or 15 may be rearranged and/or combined into a single component, step, feature or function or embodied in several components, steps, or functions. Additional elements, components, steps, and/or functions may also be added without departing from the invention. The apparatus, devices, and/or components illustrated in FIGS. 2, 3, 4, 14, and/or 15 may be configured to perform one or more of the methods, features, or steps described in FIGS. 5, 6, 7, 8, 9, 10, 11, 12, and/or 13. The algorithms described herein may also be efficiently implemented in software and/or embedded in hardware.

Moreover, in one aspect of the disclosure, the processing circuit 1402 illustrated in FIGS. 14 and 15 may be a specialized processor (e.g., ASIC) that is specifically designed and/or hard-wired to perform the algorithms, methods, and/or steps described in FIGS. 5, 6, 7, 8, 9, 10, 11, 12, and/or 13 and the associated text. Thus, such a specialized processor (e.g., ASIC) may be one example of a means for executing the algorithms, methods, and/or steps described in FIGS. 5, 6, 7, 8, 9, 10, 11, 12, and/or 13.

Also, it is noted that the aspects of the present disclosure may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Moreover, a storage medium may represent one or more devices for storing data, including read-only memory (ROM), random access memory (RAM), magnetic disk storage mediums, optical storage mediums, flash memory devices and/or other machine-readable mediums and, processor-readable mediums, and/or computer-readable mediums for storing information. The terms "machine-readable medium", "computer-readable medium", and/or "processor-readable medium" may include, but are not limited to non-transitory mediums such as portable or fixed storage devices, optical storage devices, and various other mediums capable of storing or containing instruction(s) and/or data. Thus, the various methods described herein may be fully or partially implemented by instructions and/or data that may be stored in a "machine-readable medium", "computer-readable medium", and/or "processor-readable medium" and executed by one or more processors, machines and/or devices.

Furthermore, aspects of the disclosure may be implemented by hardware, software, firmware, middleware, microcode, or any combination thereof. When implemented in software, firmware, middleware or microcode, the program code or code segments to perform the necessary tasks may be stored in a machine-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The various illustrative logical blocks, modules, circuits, elements, and/or components described in connection with the examples disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing components, e.g., a combination of a DSP and a microprocessor, a number of microprocessors, one or more microprocessors in conjunction with a DSP core, or any other such configuration.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

Those of skill in the art would further appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

The various features of the invention described herein can be implemented in different systems without departing from the invention. It should be noted that the foregoing aspects of the disclosure are merely examples and are not to be construed as limiting the invention. The description of the aspects of the present disclosure is intended to be illustrative, and not to limit the scope of the claims. As such, the present teachings can be readily applied to other types of apparatuses and many alternatives, modifications, and variations will be apparent to those skilled in the art.

What is claimed is:

1. A computing device, comprising:
   an input interface;
   a first display adapted to display a first action requesting user approval, the first action requested by an application;
   a communication interface; and
   a processing circuit communicatively coupled to the communication interface, the first display, and the input interface, the processing circuit adapted to:
      receive a request from the application to authorize a second action that is different than the first action;
      receive the request to authorize the second action while the first display displays the first action;
      generate a dynamic access code;
      associate the dynamic access code with the second action;
      transmit a message that includes the dynamic access code and information data associated with the second action to a secondary display device for display of the message on a second display of the secondary display device; and
      authorize the second action received from the application if the dynamic access code is entered into the input interface or decline the second action received from the application if the dynamic access code is not entered into the input interface.

2. The computing device of claim 1, the processing circuit further adapted to:
   encrypt the message using a session key prior to transmitting the message to the secondary display device.

3. The computing device of claim 1, the processing circuit further adapted to:
   provide a digital signature using a secret key to the application after authorizing the second action received from the application.

4. The computing device of claim 1, wherein the processing circuit is a secure processor that is part of a secure execution environment.

5. The computing device of claim 1, wherein the dynamic access code is at least one of a number code, an alphanumeric code, a drawing, a symbol, a picture, and/or an icon.

6. The computing device of claim 1, wherein the dynamic access code is at least one of a linear barcode and/or a matrix barcode, and the input interface includes at least one of a camera and/or a barcode scanner adapted to scan the at least one of the linear barcode and/or the matrix barcode displayed on the secondary display device to obtain barcode data, and the processing circuit is further adapted to authorize the action received from the application if the barcode data obtained matches expected barcode data transmitted to the secondary display device.

7. The computing device of claim 1, the processing circuit further adapted to:
   receive a plurality of requests from the application to authorize a plurality of actions;
   generate a plurality of unique dynamic access codes, each unique dynamic access code generated associated with a single action of the plurality of actions;
   transmit a plurality of messages to the secondary display device for display on the display of the secondary display device, each message of the plurality of messages including information data associated with an action of the plurality of actions and the dynamic access code associated with the action of the plurality of actions; and authorize each action of the plurality of actions if the dynamic access code associated with the action of the plurality of actions is entered into the input interface.

8. The computing device of claim 1, wherein the action includes at least one of (a) transferring of funds, (b) directing the computing device to a website, and/or (c) at least one of encrypting and/or decrypting data with a secret key.

9. The computing device of claim 1, wherein the application is resident to the computing device.

10. The computing device of claim 1, wherein the secondary display device is a wearable device.

11. The computing device of claim 1, wherein the message is transmitted to the secondary display device wirelessly and directly using a short range communication protocol.

12. The computing device of claim 1, wherein the information data associated with the action includes at least one of a financial transaction amount, a uniform resource locator (URL) address, and/or a file name to be encrypted and/or decrypted.

13. A method operational at a primary electronic communication device for secure display on a secondary display device, the method comprising:

displaying, on a first display of the primary electronic communication device, a first action requesting user approval, the first action requested by an application;

receiving, at a processing circuit of the primary electronic communication device, a request from the application to authorize a second action that is different than the first action;

receiving, at the processing circuit, the request to authorize the second action while the first display displays the first action;

generating, at the processing circuit, a dynamic access code;

associating, at the processing circuit, the dynamic access code with the second action;

transmitting a message that includes the dynamic access code and information data associated with the second action from the primary electronic communication device to the secondary display device for display of the message on a second display of the secondary display device; and authorizing the second action received from the application if the dynamic access code is entered into an input interface of the primary electronic communication device or decline the second action received from the application if the dynamic access code is not entered into the input interface.

14. The method of claim 13, further comprising:
encrypting the message using a session key prior to transmitting the message to the secondary display device.

15. The method of claim 13, further comprising:
providing a digital signature using a secret key to the application after authorizing the second action received from the application.

16. The method of claim 13, wherein the processing circuit is a secure processor that is part of a secure execution environment.

17. The method of claim 13, wherein the dynamic access code is at least one of a number code, an alphanumeric code, a drawing, a symbol, a picture, and/or an icon.

18. The method of claim 13, wherein the dynamic access code is at least one of a linear barcode and/or a matrix barcode, and the input interface includes at least one of a camera and/or a barcode scanner adapted to scan the at least one of the linear barcode and/or the matrix barcode displayed on the secondary display device to obtain barcode data, and the method further comprising:

authorizing the action received from the application if the barcode data obtained matches expected barcode data transmitted to the secondary display device.

19. The method of claim 13, further comprising:
receiving a plurality of requests from the application to authorize a plurality of actions;

generating a plurality of unique dynamic access codes, each unique dynamic access code generated associated with a single action of the plurality of actions;

transmitting a plurality of messages from the primary electronic communication device to the secondary display device for display on the display of the secondary display device, each message of the plurality of messages including information data associated with an action of the plurality of actions and the dynamic access code associated with the action of the plurality of actions; and authorizing each action of the plurality of actions if the dynamic access code associated with the action of the plurality of actions is entered into the input interface.

20. The method of claim 13, wherein the action includes at least one of (a) transferring of funds, (b) directing the primary electronic communication device to a website, and/or (c) at least one of encrypting and/or decrypting data with a secret key.

21. The method of claim 13, wherein the application is resident to the primary electronic communication device.

22. The method of claim 13, wherein the secondary display device is a wearable device.

23. The method of claim 13, wherein the message is transmitted to the secondary display device wirelessly and directly using a short range communication protocol.

24. The method of claim 13, wherein the information data associated with the action includes at least one of a financial transaction amount, a URL address, and/or a file name to be encrypted and/or decrypted.

25. A computing device, comprising:
an input interface;
a first display adapted to display a first action requesting user approval, the first action requested by an application;
a memory circuit;
a communication interface; and
a processing circuit communicatively coupled to the communication interface, the memory circuit, the first display, and the input interface, the processing circuit adapted to:
receive a request from the application to authorize a second action that is different than the first action;
receive the request to authorize the second action while the first display displays the first action;
transmit a message that includes information data associated with the second action to a secondary display device for display on a second display of the secondary display device;
receive, at the input interface, biometric data associated with a user of the computing device and the secondary display device; and
authorize the second action received from the application if it is determined that the biometric data received at the input interface matches biometric data stored in the memory circuit or decline the second action received from the application if no biometric data is received at the input interface that matches biometric data stored in the memory circuit.

26. The computing device of claim 25, wherein the information data associated with the action includes at least one of a financial transaction amount, a URL address, and/or a file name to be encrypted and/or decrypted.

27. A method operational at a primary electronic communication device for secure display on a secondary display device, the method comprising:

displaying, on a first display of the primary electronic communication device, a first action requesting user approval, the first action requested by an application;

receiving, at a processing circuit of the primary electronic communication device, a request from the application to authorize a second action that is different than the first action;

receiving, at the processing circuit, the request to authorize the second action while the first display displays the first action;

transmitting a message that includes information data associated with the second action from the primary electronic communication device to the secondary display device for display on a second display of the secondary display device;

receiving, at an input interface of the primary electronic communication device, biometric data associated with a user of the primary electronic communication device and the secondary display device; and authorizing the second action received from the application if it is determined that the biometric data received at the input interface matches biometric data stored in a memory circuit of the primary electronic communication device or decline the second action received from the application if no biometric data is received at the input interface that matches biometric data stored in the memory circuit.

* * * * *